US007881286B2

(12) United States Patent
Zabawskyj et al.

(10) Patent No.: US 7,881,286 B2
(45) Date of Patent: Feb. 1, 2011

(54) METHOD FOR DISTRIBUTING AND EXECUTING SERVICE LOGIC

(75) Inventors: Bohdan Konstantyn Zabawskyj, Woodbridge (CA); Duncan Ratcliffe, Oakville (CA); Rubens Rahim, Markham (CA); Lucas Skoczkowski, Oakville (CA)

(73) Assignee: Redknee Inc. (CA)

( * ) Notice: Subject to any disclaimer, the term of this patent is extended or adjusted under 35 U.S.C. 154(b) by 359 days.

(21) Appl. No.: 11/617,047

(22) Filed: Dec. 28, 2006

(65) Prior Publication Data
US 2007/0127683 A1 Jun. 7, 2007

Related U.S. Application Data

(62) Division of application No. 10/066,745, filed on Feb. 6, 2002, now Pat. No. 7,277,444.

(51) Int. Cl.
H04L 12/66 (2006.01)
(52) U.S. Cl. .................. 370/352; 370/401; 445/466
(58) Field of Classification Search .................. None
See application file for complete search history.

(56) References Cited
U.S. PATENT DOCUMENTS 6,215,790 B1 * 4/2001 Voit et al. ............... 370/401
6,522,876 B1 * 2/2003 Weiland et al. .......... 455/414.1
7,180,889 B1 * 2/2007 Kung et al. ................ 370/352
2002/0098855 A1 * 7/2002 Hartmaier et al. .......... 455/466

* cited by examiner

Primary Examiner—Duc C Ho
(74) Attorney, Agent, or Firm—Katten Muchin Rosenman LLP

(57) ABSTRACT

A method of distributing and executing service logic across private and public networks for the generation and provision of telecommunication services is disclosed. The functionality and capabilities associated with both Intelligent Network (IN) and non-IN compliant elements of a public telecommunications system are abstracted using a set of control and informational parameters and variables which are associated with a given network element or network element category. A service creation and execution application programming interface provides access to a service creation and execution environment which is distributed in public network gateways, private network gateways, and in compatible software platforms. The distributed service creation and execution environment enable the generation, provisioning, and execution of applications across private and public telecommunication networks in order to provide novel telecommunication services via the serial or concurrent invocation of one or more distributed applications.

20 Claims, 15 Drawing Sheets

— TRANSPORT FACILITY (E.G. ISDN, E1/T1)
......... SIGNALLING FACILITY (E.G. SS7, SCTP)
- - - - TCP/IP OR X.25

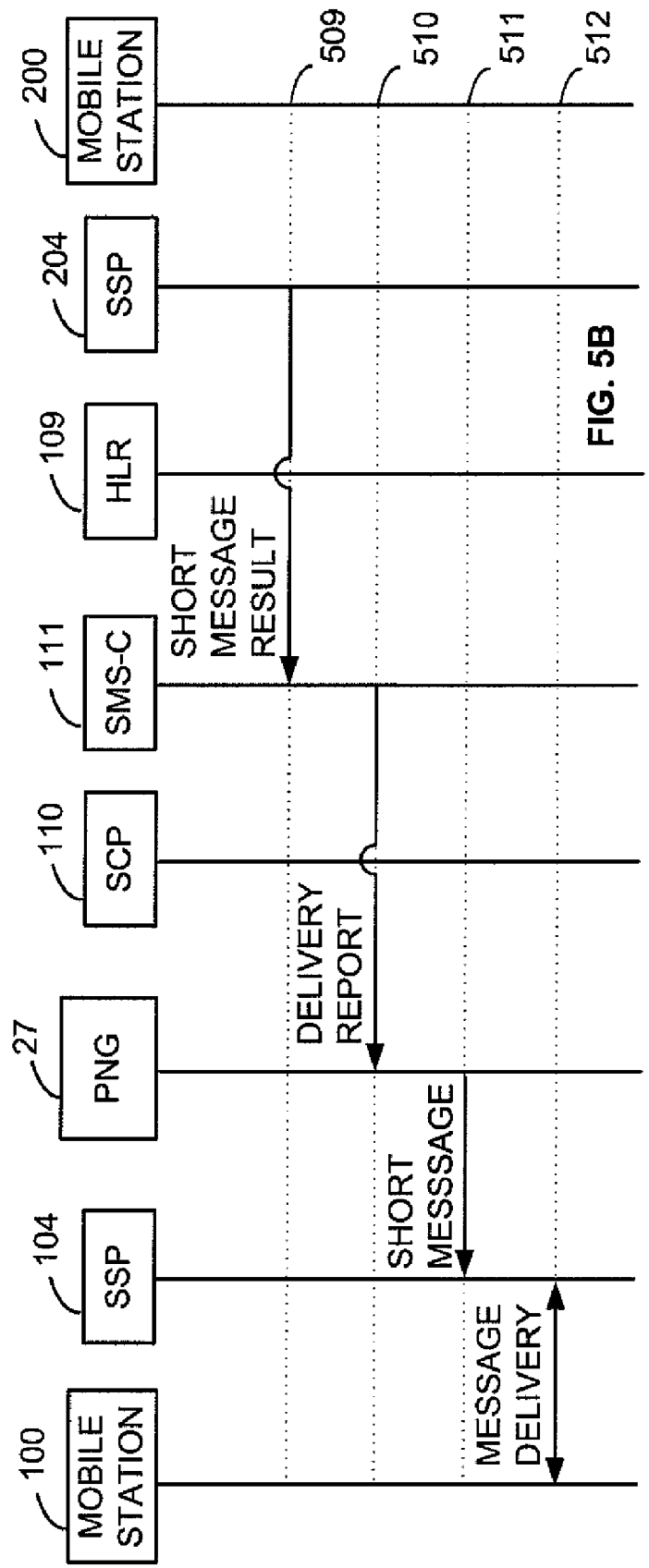

——— TRANSPORT FACILITY (E.G. ISDN, E1/T1)
·········· SIGNALLING FACILITY (E.G. SS7, SCTP)
- - - - TCP/IP OR X.25

—— TRANSPORT FACILITY (E.G. ISDN, E1/T1)
·········· SIGNALLING FACILITY (E.G. SS7, SCTP)
- - - - TCP/IP OR X.25

— TRANSPORT FACILITY (E.G. ISDN, E1/T1)
······ SIGNALLING FACILITY (E.G. SS7, SCTP)
---- TCP/IP OR X.25

METHOD FOR DISTRIBUTING AND EXECUTING SERVICE LOGIC

PRIORITY CLAIM

The present application is a divisional application claiming priority from U.S. Ser. No. 10/066,745, filed Feb. 6, 2002, the contents of which are incorporated herein by reference.

BACKGROUND OF THE INVENTION

Mobile network operators are faced with the challenge of introducing new applications and services. The ability to introduce new functionality that delivers competitive differentiation quickly, cost effectively and that can evolve with ease to next generation network environments are considered essential attributes by network operators.

SS7 networks have dramatically improved efficiencies of circuit-switched networks and have provided for the ability to decouple control logic and network intelligence from switching centers through the introduction of Intelligent Network (IN) core elements including Service Control Points (SCPs) and Intelligent Peripherals (IPs). The ability to send information 'out-of-band' from the underlying circuit-switched bearer channels and the decoupling of service logic has enabled a host of value added services including Calling Party Identification, Toll-free, Prepaid, and Short-Message services.

In particular, Service Creation Environments (SCEs) associated with Intelligent Network (IN) infrastructure have provided operators with the ability to deal with the complexities of designing and introducing new applications which utilize the existing terminal mobility infrastructure based on a 'Basic State Call Model' (BSCM) which in turn is comprised of several interlinked 'Trigger Detection Points' (TDPs). If certain conditions are met when call processing arrives at a TDP, normal call processing is interrupted in order to retrieve supplemental instructions from service logic which resides outside of the end-office on a Service Control Point (SCP). Call processing resumes once a response is received from the SCP—accommodating for any supplemental instructions provided by the SCP.

The SCE environment associated with IN infrastructure has typically required a high degree of specialization in order to understand the nuances of the underlying signalling protocols of the telecommunications environment as well as the vendor-specific proprietary implementation of the SCE environment. The existing SCE environment associated with IN infrastructure therefore lacks a set of open programming language-independent application programming interfaces which abstract and distil the functionality and capabilities of the underlying network elements and which leverage available development tools which are commonly available in the Information Technology (IT) environment.

The existing SCE environment has also been focused with respect to the provision of services which involve the functionality and capabilities of network elements within the public telecommunications network. The existing SCE environment does not allow for the management, provisioning, generation, and execution of telecommunication services beyond the domain of the telecommunications network. Specifically, existing SCE environments do not allow for the management, provisioning, generation, and execution of telecommunication services on a computer platform located in the private network via an application programming interface. Similarly, existing SCE environments do not allow for the management, provisioning, generation, and execution of telecommunication services which involve the functionality and capabilities of network elements located within the domain of the private network.

Many of these limitations have been based on the reliance of defined IN protocols such as ANSI-41 Wireless Intelligent Network (WIN), Global System for Mobile Communications (GSM) Intelligent Network Application Part (INAP), and GSM Customized Applications for Mobile network-Enhanced Logic (CAMEL) which accommodate for the transfer of service requests and responses among the network elements associated with the IN network. From the perspective of providing an accelerated method and system of generating compelling new services, these protocols are deficient in that they only address a subset of the functionality associated with a given network element. In particular, existing SCE environments do not attempt to access the entire spectrum of functionality or abstract the capabilities of a given network element by interfacing with the network element using the native protocols supported by the network elements. This deficiency is particularly evident in the case of network elements associated with private networks in that IN protocols do not address the functionality and capabilities provided by private network elements.

There are no known prior art teachings of a solution to the aforementioned deficiencies and shortcomings such as that disclosed herein. The prior art describes various mechanisms of generating specific services utilizing the existing capabilities of the existing SCE and IN environment, methods and systems of improving selected facets of the existing SCE and IN environment in order to provide complimentary capabilities via additional adjuncts located in the public or private domain, or methods and systems of providing a limited degree of interaction with private networks.

In particular, U.S. Pat. No. 6,044,274 by Vo, et al. provides for a mechanism whereby a given call from an non-IN capable end-office is redirected to an IN capable end-office for the purpose of applying the IN call model for the call. However, Vo et al. does not teach or suggest a method of providing telecommunication services utilizing the existing interfaces provided by the end-office.

U.S. Pat. No. 6,094,479 by Lindeberg et al. provides a bridging functionality for the purpose allowing a Computer Telephony Integration (CTI) server to emulate a public IN network element and to request a service from an existing IN service control point. However, Lindeberg et al. does not does not teach or suggest a method of provisioning, managing, generating, and executing services in a distributed fashion between the private and public domain.

U.S. Pat. No. 6,098,094 by Barnhouse et al. provides for a system which would directly replace the service switching component of existing IN networks with a distributed network architecture of computer servers. However, Barnhouse et al. does not does not teach or suggest a method of utilizing the existing base of network elements in the public and private domain.

U.S. Pat. No. 6,104,797 by Nabkel, et. al. provides for a method of generating new telecommunication services by distributing the intelligence presently resident in the public telecommunications network via the use of specialized Customer Premises Equipment (CPE) referred to as a Intelligent Communications Device (ICD). However, Nabkel et. al does not does not teach or suggest a method of utilizing the existing base of customer premises equipment and mobile stations in the public and private domain.

U.S. Pat. No. 6,115,746 by Waters et al. provides a mechanism of generating new telecommunications services by inserting new service logic into an existing IN service control point via a set of Intelligent Peripheral Controllers (IPCs) and Intelligent Peripheral Adapters (IPAs) which abstract the service logic associated with the SCP. However, Waters et. al does not does not teach or suggest a method of abstracting the capabilities of other network elements in the private and public domain.

U.S. Pat. No. 6,178,438 by Tschirhart et al. provides a distributed service management system for an IN environment. However, Tschirhart et al. does not does not teach or suggest a method of extending the distributed service management system to include the network elements in the private domain nor does Tschirhart et al. teach or suggest a method of providing telecommunication services utilizing the existing non-IN interfaces provided by the underlying Network Elements.

REFERENCES CITED

U.S. Pat. No. 5,345,502 September 1994 Rothenhofer 379/221 U.S. Pat. No. 5,764,977 June 1998 Oulid-Aissa, et al. 707/10 U.S. Pat. No. 5,708,702 January 1998 De Paul, et al. 379/221 U.S. Pat. No. 5,862,334 January 1999 Schwartz, et al. 709/223 U.S. Pat. No. 6,014,377 January 2000 Gillespie 370/351 U.S. Pat. No. 6,016,318 January 2000 Tomoike 370/401 U.S. Pat. No. 6,029,067 February 2000 Pfundstein 455/426 U.S. Pat. No. 6,038,456 March 2000 Colby, et al. 455/456 U.S. Pat. No. 6,044,274 March 2000 Vo, et al. 455/461 U.S. Pat. No. 6,094,479 July 2000 Lindeberg, et al. 379/220 U.S. Pat. No. 6,097,937 August 2000 Sawyer 455/406 U.S. Pat. No. 6,098,094 August 2000 Barnhouse, et al. 709/203 U.S. Pat. No. 6,104,797 August 2000 Nabkel, et al. 379/201 U.S. Pat. No. 6,115,746 September 2000 Waters, et al. 709/229 U.S. Pat. No. 6,161,012 December 2000 Fenton, et al. 455/432 U.S. Pat. No. 6,178,438 January 2001 Tschirhart, et al. 709/200.

OTHER REFERENCES

GSM 02.78, "Digital cellular telecommunications systems (Phase 2+); Customized Applications for Mobile network Enhanced Logic (CAMEL) Stage 1".

GSM 03.78, "Digital cellular telecommunications systems (Phase 2+); Customized Applications for Mobile network Enhanced Logic (CAMEL) Stage 2".

GSM 03.40"Digital cellular telecommunications system (Phase 2+); Technical realization of the Short Message Service (SMS)".

GSM 09.02 (ETS 300 974), "Digital cellular telecommunications system (Phase 2+); Mobile Application Part (MAP) specification".

Heine, Gunnar. GSM Networks: Protocols, Terminology, and Implementation (Artech House Inc., Norwood, Mass., 1999).

Christensen, G., Florack, P. G., Duncan, R. Wireless Intelligent Networking (Artech House Inc., Norwood, Mass., 2001). TECHNICAL FIELD The present invention relates to telecommunication network implementations, and, in particular, to a method and system for distributing and executing service logic for the provision of telecommunication services in both private and public networks.

SUMMARY OF THE INVENTION

A method of distributing and executing service logic across private and public networks for the generation and provision of telecommunication services is disclosed.

The functionality and capabilities associated with both Intelligent Network (IN) and non-IN compliant elements of a public telecommunications system are abstracted into one or more network element objects (NEOs) using a set of control and informational parameters and variables which are associated with a given network element or network element category. A service creation and execution environment (SCEE) provides an open service creation environment which provides a developer the ability to generate and provision applications using NEOs in conjunction with a service creation and execution application programming interface (SCEAPI).

SCEAPI provides access to SCEE which resides in a public network gateway (PNG) by means of referencing NEOs or invoking SCEE compliant applications using directives along with any associated parameters.

A PNG interfaces with plurality of network elements which may reside in a plurality of networks either directly or indirectly via a plurality of telecommunication protocols via a Network Interface Layer (NIL). SCEAPI in conjunction with the PNS provides for a distributed service creation and execution environment in order to enable the generation, provisioning, and execution of services in a manner which is independent of the complexities and nuances of the underlying network infrastructure. A given service may be generated and provisioned, for example, by invoking the call processing or billing processes resident in the underlying network elements using SCEAPI.

A private network gateway (PVNG) is a variant of the PNG which is located outside the public network domain. The PVNG is functionally similar to the PNG in that it supports SCEAPI and contains SCEE in order to order to enable the generation and provisioning of services by abstracting the informational and control parameters and variables associated with network elements or network element categories associated with the private network domain.

SCEE compliant applications may be developed and executed on the PNG or PVNG or may be developed and executed on alternative SCEE compliant software platforms. The PNG, PVNG, and other SCEE compliant servers communicate with each other via SCEAPI. SCEAPI is used in order to relay SCEE compliant service logic including service requests and responses, to access a network element in the underlying public or private network, or to invoke SCEE compliant applications resident on the SCEE compliant software platform. SCEE compliant applications may in turn issue other SCEAPI directives in order to invoke capabilities supported by the software platform. Alternatively, SCEE compliant applications may in turn invoke other SCEE compliant applications resident on the software platform or other SCEE compliant software platforms.

The PNG and PVNG in conjunction with SCEAPI and SCEE enable the generation and provisioning of services in both the public and private domain. In particular, the applications supported directly or indirectly by the PNG and PVNG via SCEAPI permit the capabilities provided by the public and private network elements to be utilized and controlled in a manner which is defined by the service creation and execution environment resident on the PNG and PVNG and only limited by the underlying capabilities of the network elements and any restrictions imposed by the operators of networks associated with the public and private domain.

The PNG and PVNG in conjunction with SCEAPI and SCEE enable the generation, provisioning, and execution of applications which may be invoked in a serial or concurrent fashion to provide telecommunication services in a distributed fashion across a plurality of PNGs and PVNGs. As an example of the use of the SCEE and SCEAPI, the PVNG may be used to develop applications for the public network by utilizing SCEAPI and SCEE in order to provide access to the network elements under the control of the PNG. For example, a service for a public telecommunications network may be formulated on a PVNG using SCEE and relayed via a communication channel to the PNG which will validate the service logic and invoke the requisite capabilities in the underlying public network(s) upon receiving a service invocation request from the PVNG. Alternatively, applications may be developed independently on the PVNG and PNG and invoked via SCEAPI compliant directives from a co-resident application or by an application resident on an alternative PVNG or PNG.

An aspect of the specification provides a method of communicating with a private or public telecommunications system. The method comprises interfacing with the network elements which comprise a public communication network, wherein the network includes network elements consisting of at least one switching center, and an intelligent network that includes a number of network elements having a service switching function or service control function. The method further comprises interfacing with the network elements which comprise a private communication network, wherein the network includes a private branch exchange in which access is provided between the public communications network and the private network over at least one interface. The method further comprises utilizing the native communication protocols supported by the network elements located in the domain of both the public communications network and private network.

A method according to a specific aspect of the foregoing provides that the informational and control parameters and variables associated with a public telecommunications network element are distilled into a vector of alphanumeric values or objects.

A method according to a specific aspect of the foregoing provides that the vector of alphanumeric values or objects may define the state of a particular subscriber.

A method according to a specific aspect of the foregoing provides that the vector of alphanumeric values or objects may define the state of a particular circuit-switched or packet-switched session.

A method according to a specific aspect of the foregoing provides that the vector of alphanumeric values or objects may define the controllable attributes of a public telecommunications network element.

A method according to a specific aspect of the foregoing provides that the vector of alphanumeric values or objects may be a set of alphanumeric values or objects. Further, a set of alphanumeric values or objects set may be utilized to provide an application programming interface which execute on a computer platform.

A method according to a specific aspect of the foregoing provides that the informational and control parameters and variables associated with a private network element are distilled into a vector of alphanumeric values or objects.

A method according to a specific aspect of the foregoing provides that the vector of alphanumeric values or objects may define the state of a particular subscriber.

A method according to a specific aspect of the foregoing provides that the vector of alphanumeric values or objects may define the state of a particular circuit-switched or packet-switched session.

A method according to a specific aspect of the foregoing provides that the vector of alphanumeric values or objects may define the controllable attributes of a private network element.

A method according to a specific aspect of the foregoing provides that the vector of alphanumeric values or objects may be a set of alphanumeric values or objects. Further, a set of alphanumeric values or objects set may be utilized to provide an application programming interface which execute on a computer platform.

As an example of the use of the SCEE and SCEAPI to provide telecommunication services via the serial or concurrent execution of applications resident on PNGs or PVNGs, upon meeting an initial set of conditional requirements associated with a subscriber's profile such as the time of day, an application resident on a PNG or PVNG may invoke one or more applications resident on an alternative PNG or PVNG via a SCEAPI directive. The alternative PNG or PVNG will validate the request and invoke the requisite capabilities in the underlying public or private networks or other applications or resources resident on the PNG or PVNG in a serial or concurrent fashion pursuant to the SCEAPI compliant commands and parameters provided by the invoking application and pursuant to any incremental conditional requirements defined by service logic and other conditional requirements associated with the invoked applications. This method of providing telecommunication services can be extended in that the alternative PNG or PVNG may elect, pursuant to the execution of service logic, invoke applications resident in a plurality of other alternative PNGs or PVNGs in a concurrent or serial fashion.

The PNG and PVNG in conjunction with SCEE and SCEAPI therefore provides a method of distributing and executing service logic across private and public networks for the generation and provision of telecommunication services via a distributed service creation and execution environment.

BRIEF DESCRIPTION OF THE DRAWINGS

FIG. 5A and FIG. 5B show message flow diagrams of a representative interaction illustrating the inventive concepts for a pre-paid short message service application of the present invention;

DETAILED DESCRIPTION OF THE EMBODIMENTS

In the following description, for purposes of explanation and not limitation, specific details are set forth, such as particular embodiments, elements, interfaces, hardware configurations, data structures, software flows, techniques, etc. in order to provide a thorough understanding of the present invention. However, it will be apparent to one skilled in the art that the present invention may be practiced in other embodiments that depart from these specific details. In other instances, detailed descriptions of well known methods, devices, and elements are omitted so as not to obscure the description of the present invention with unnecessary detail.

Figure 1:
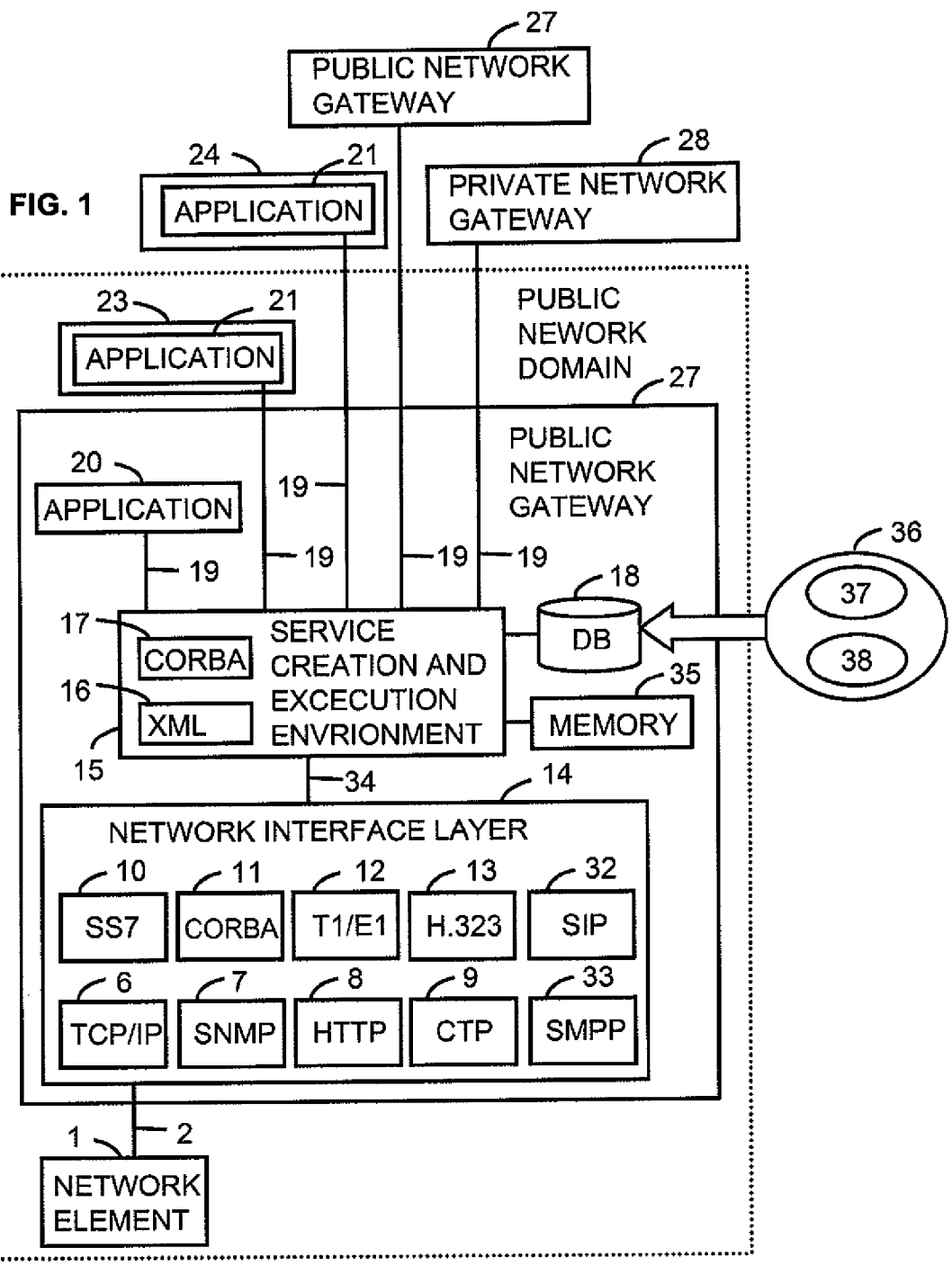
FIG. 1 illustrates a functional block diagram of the public network gateway in accordance with a simplified, non-limiting embodiment of the present invention.

Referring to FIG. 1, a functional block diagram of the public network gateway (PNG) 27 is shown. PNG 27 will reside on a software platform (not shown) designed to support the development and execution of applications. The software platform may include an object request broker (ORB) agent (not shown), a distributed object management environment for interprocess communications (not shown), an event manager that coordinates and distributes events according to the priority indicated by processes (not shown), and a service manager that provides process level control for application processes (not shown). Not shown is the user interface for the PNG which provides the operational support that is required throughout the process of service creation, such as service documentation, managed object definition, interface definition, protocol definition and data input definition. The collection of operations are encapsulated in managed objects which may be manipulated via a Graphical User Interface (GUI) or invoked via command line instructions.

The functionality and capabilities associated with both Intelligent Network (IN) and non-IN compliant elements of a public telecommunications system are abstracted into one or more network element objects (NEOs) 34 using a set of control and informational parameters and variables which are associated with a given network element or network element category.

Referring to FIG. 1, a service creation and execution environment (SCEE) 15 provides an open service creation environment which provides a developer the ability to generate and provision applications using NEOs in conjunction with the service creation and execution application programming interface (SCEAPI) 19. SCEAPI provides access to SCEE which resides in a public network gateway (PNG) by means of referencing NEOs or invoking SCEE compliant applications using directives along with any associated parameters. SCEAPI 19 and SCEE 15 enable the generation and provisioning of services in a manner which is independent of the complexities and nuances of the underlying network infrastructure. In particular, a given NEO may be reused in order to communicate and control a variety of network elements produced by different vendors as variations in the parametric and logical attributes of the network elements are accommodated by mapping a functional or informational element into the control and informational parameters required by the network element. SCEE 15 includes a number of subcomponents in order to provide for a variety of object-oriented application programming interfaces. A common object request broker architecture (CORBA) 17 and extensible markup language (XML) 16 compliant subcomponents have been depicted. Those skilled in the art will recognize that other object oriented application programming interfaces may serve the same purpose without diluting the intent and scope of the present invention. A database 18 is used to store and retrieve information including, but not limited to, applications, network elements, users, interconnected networks, and sessions. A memory 35 is used for storage of service execution logic. SCEE 15 interacts with the network interface layer (NIL) 14 in order to access, communicate, and control the network elements 1 in the public telecommunications network via a suitable communications link and interface protocol 2. Database 18 contains data 36 pertaining to a) the state 37 of circuit-switched calls, data-packet sessions, and applications and b) state and profile information 38 pertaining to subscribers. In a present embodiment, the state and profile information 38 in data 36 of a group of subscribers is associated with a single record.

The informational and control parameters and variables associated with a public telecommunications network element are distilled into a vector or set of alphanumeric values or objects. A vector of alphanumeric values or objects may define: the state of a particular subscriber; the state of a particular circuit-switched or packet-switched session; and/or the controllable attributes of a public telecommunications network element. A set alphanumeric values or objects may be utilized to provide an application programming interface which execute on a computer platform.

Referring to FIG. 1, NIL 14 interacts with network elements in the public telecommunications network including, but not limited to, operation support systems, customer care systems, service switching points (SSPs), service control points (SCPs), short message service centers (SMS-Cs), intelligent peripherals (IPs) and home location registers (HLRs). NIL utilizes a number of subcomponents which transcodes and formats messages and commands in a manner which complies with the interconnection protocols supported by a plurality of network elements. Protocol transcoding subcomponents depicted in FIG. 1 include those which support Common Object Request Broker Architecture (CORBA) 11, T1/E112, H.323 13, session initiation protocol (SIP) 32, short message peer to peer (SMPP) 33, transmission control protocol/internet protocol (TCP/IP) 6, simple network management protocol (SNMP) 7, hypertext transfer protocol (HTTP) 8, computer telephony integration (CTI) 9, and signaling system #7 (SS7) 10. Those skilled in the art will recognize that other interconnection protocols may serve a similar purpose without diluting the intent and scope of the present invention. Not shown are the terminal adaptors which would provide the physical connectivity associated with a communications link for the purpose of establishing connectivity to a network element.

Referring to FIG. 1, applications 20 21 which utilize SCEAPI 19 to access SCEE 15 may reside on the PNG 27 or may reside on alternative software platforms 23 24. The alternative software platforms 23 24 may reside within the domain of the public network 23 or in a domain external to the public network 24 The applications resident on the external software platforms may communicate with the PNG 27 using the objects defined by SCEAPI 19 and SCEE 15 via a communications link. The communications link may utilize a variety of signalling protocols including transmission control protocol/internet protocol (TCP/IP). Not shown is the mediation function which screens incoming objects for SCEAPI and SCEE compliance. By extending the use of SCEAPI 19 and SCEE 15 to alternative software platforms, the service creation environment may be extended outside the PNG 27 and outside the public network domain. In particular, a service for a public telecommunications network may be formulated on an alternative software platform and relayed via a communication channel to the PNG which will validate the request and invoke the requisite capabilities in the underlying public network(s).

Referring to FIG. 1, a private network gateway (PVNG) 28 is a variant of the PNG 27 which is located outside the public network domain.

Figure 2:
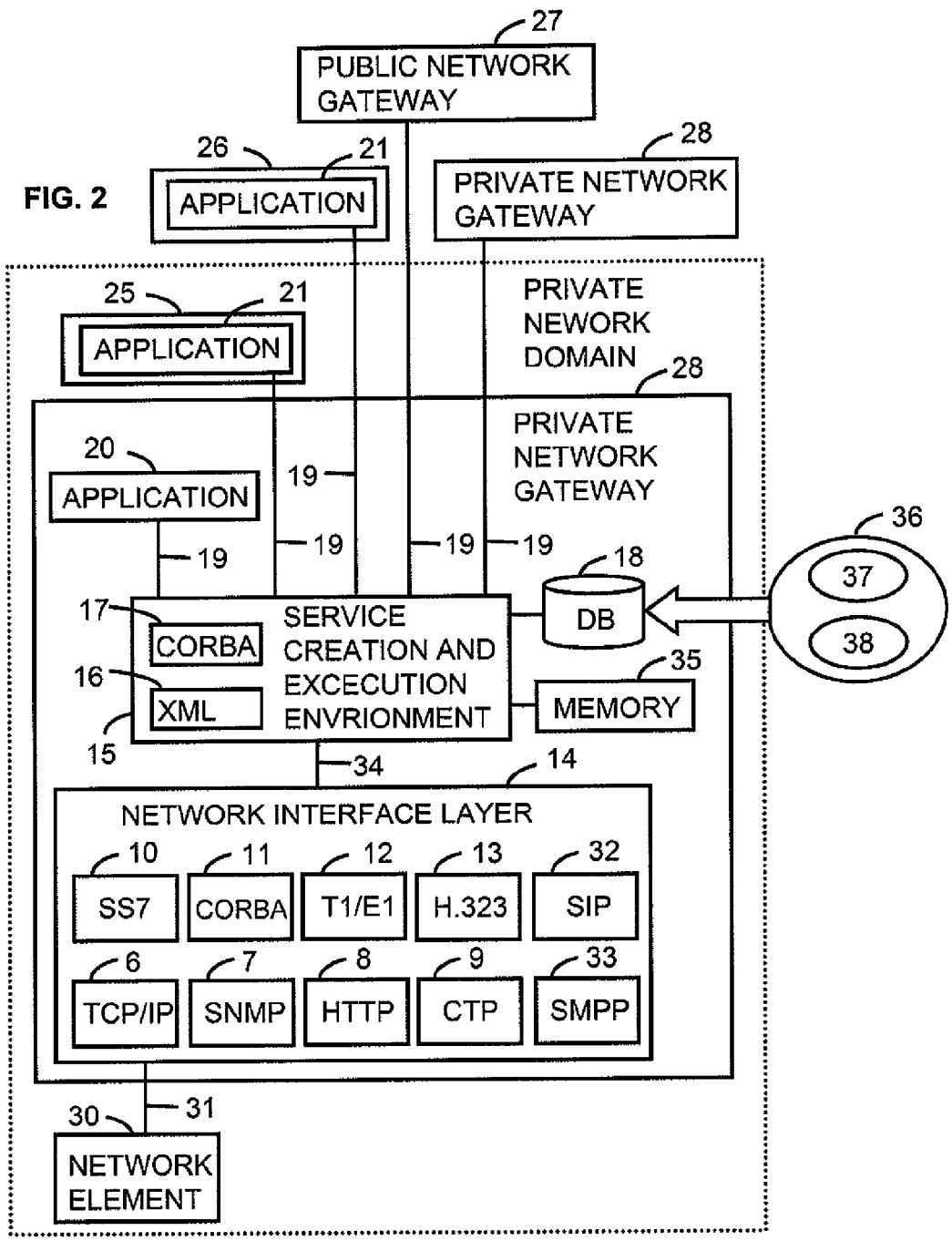
FIG. 2 illustrates a functional block diagram of the private network gateway in accordance with a simplified, non-limiting embodiment of the present invention.

Referring to FIG. 2, the PVNG 28 is functionally similar to the PNG 27 in that it contains SCEE 15 in order to provide for a service creation environment and NIL to access and control network elements. The PVNG 28 is tailored to the environment defined by the private domain and will contain subcomponents and NEOs which are tailored to the private domain. For example, the PVNG 28 may support NEOs and the associated NIL subcomponents in order to access and control a network element 30 such as a private branch exchange (PBX) via suitable communications link and interface protocol 31 such as TCP/IP. As in the case of the PNG 27, SCEAPI 19 compliant applications 20 21 may be developed and executed on the PVNG 28 or may be developed and executed on alternative software platforms 25 26. The alternative software platforms may reside within the domain of the private network 25 or in a domain external to the private network 26. The PVNG 28 may be used to develop applications for the public network by utilizing SCEAPI 19 in order to provide access to the network elements under the control of the PNG 27.

The informational and control parameters and variables associated with a private network element are distilled into a vector or set of alphanumeric values or objects. A vector of alphanumeric values or objects may define: the state of a particular subscriber; the state of a particular circuit-switched or packet-switched session; and/or the controllable attributes of a private network element. A set alphanumeric values or objects may be utilized to provide an application programming interface which execute on a computer platform.

Referring to FIG. 1 and FIG. 2., SCEE 19 compliant applications may be developed and executed on the PNG 27 or PVNG 28 or may be developed and executed on alternative SCEE compliant software platforms.

The PNG 27, PVNG 28, and other SCEE compliant servers 23 24 25 26 communicate with each other via SCEAPI 19. SCEAPI 19 may be used in order to relay SCEE compliant service logic including service requests and responses, to access a network element in the underlying public or private network, or to invoke SCEE compliant applications resident on the SCEE compliant software platform. SCEE compliant applications 20 21 may in turn issue other SCEAPI directives in order to invoke capabilities supported by the software platform. Alternatively, SCEE compliant applications 20 21 may in turn invoke other SCEE compliant applications resident on the software platform or other SCEE compliant software platforms.

Figure 3:
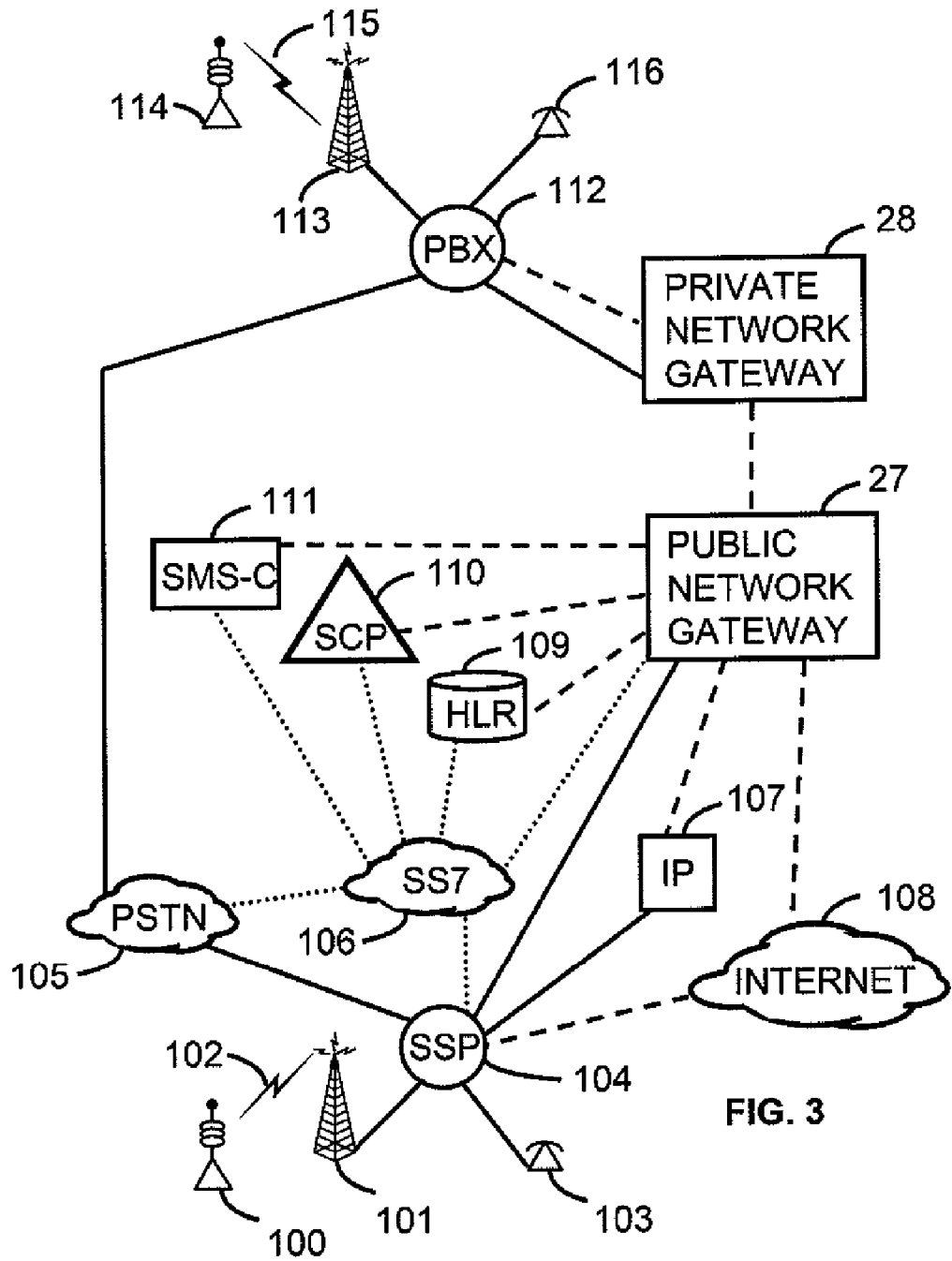
FIG. 3 illustrates the configuration of the public network gateway and private network gateway in an example telecommunications system in accordance with a non-limiting embodiment of the present invention.

Referring to FIG. 3, the configuration of the PNG 27 and PVNG 28 in an example telecommunications system is illustrated in a block diagram. Those skilled in the art will appreciate that the illustrated network elements do not represent all of the physical nodes used to realize a public or private telecommunications network.

Referring to FIG. 3, the SS7 106 network provides signalling connectivity among a number of network elements in the public network including SSPs 104, SMS-Cs 111, SCPs 110, and HLRs 109. Signalling connectivity can also be provided by other protocols including the Stream Control Transmission Protocol (STCP) specified by the Internet Engineering Task Force (IETF). The SSP 104 provides for a source and sink of communications traffic as the SSP serves fixed stations 103 or mobile stations 100. SSPs 104 generally serve either fixed 103 or mobile stations 100 although in some configurations they may serve both fixed and mobile stations. SSPs 104 serve mobile stations 100 via base stations 101 and radio link 102. The present invention may provide applications which are applicable to both mobile 100 and fixed 103 stations. The scope of connectivity from the SSP 104 may be extended by providing SS7 connectivity and transport connectivity to the Public Switched Telephone Network (PSTN) 105.

The intelligent peripheral (IP) 107 interfaces to the SSP 104 via a transport facility such as a T1/E1 or Primary Integrated Services Digital Network (ISDN) link. The IP 107 provides a voice-based interface to callers and service subscribers for the purpose of playing pre-recorded or voice synthesized announcements and prompts. The IP 107 may be controlled via a logical communications link (not shown) established to the SCP 110. The PNG 27 has connectivity to the network elements of the public network via signalling links using industry standard protocols such as SS7, X.25, or TCP/IP The PNG 27 may also interface with certain network elements of the public network such as the SSP 104 via a transport link such as T1/E1 or Primary ISDN link in order to provide for voice-based interactions in a similar fashion as the IP 107 or to provide switching functions in a similar fashion as the SSP. The PNG 27 may also have connectivity to the public internet 108 for the purpose of acquiring information and content for applications which reside on the PNG.

Referring to FIG. 3, the private branch exchange (PBX) 112 provides a similar role to the SSP 104 in that it provides for a source and sink of communications traffic in the private domain as the PBX serves fixed stations or mobile stations. PBXs 112 generally serve either fixed 116 or mobile stations 114 although in some configurations they may serve both fixed and mobile stations. PBXs 112 serve mobile stations 114 via a base station 113 and radio link 115. The present invention may provide applications which are applicable to both mobile 114 and fixed stations 116. The scope of connectivity from the PBX 112 is extended by providing transport connectivity to the PSTN 105. The PVNG 28 has connectivity to the network elements of the private network industry standard protocols such as SS7, X.25, or TCP/IP. The PVNG 28 may also interface with the network elements of the private domain via a transport link such as T1/E1 or Primary ISDN link in order to provide for voice-based interactions in a similar fashion as the IP 107 or to provide switching functions in a similar fashion as the SSP.

Referring to FIG. 3, the network elements of the private and public domain may support ITU-T Intelligent Network capabilities as defined by the International Telecommunications Union (ITU) and the European Telecommunication Standards Institute (ETSI) orAdvance Intelligent Network (AIN) capabilities as defined by Telcordia. The present invention may provide applications which are applicable to network elements which support or do not support IN or AIN capabilities. In particular, the service creation and execution environment resident on the PNG 27 and PVNG 28 will optionally support the incremental call control capabilities provided by IN and AIN.

Referring to FIG. 3, the PNG 27 may connect to the PVNG 28 for the purpose of distributing the service creation environment between the private and public domains via SCEAPI 19. Those skilled in the art will appreciate that the PNG 27 and PVNG 28 in conjunction with SCEAPI 19 and SCEE 15 enable the generation and provisioning of new services in both the public and private domain. In particular, the applications supported directly or indirectly by the PNG 27 and PVNG 28 via SCEAPI 19 permit the capabilities provided by the public and private network elements to be utilized and controlled in a manner which is defined by the service creation environment resident on the PNG 27 and PVNG 28 and only limited by the underlying capabilities of the network elements and any restrictions imposed by the operators of networks associated with the public and private domain.

Referring to FIG. 3, the PNG 27 and PVNG 28 in conjunction with SCEAPI and SCEE enable the generation, provisioning, and execution of applications which may be invoked in a serial or concurrent fashion to provide telecommunication services in a distributed fashion across a plurality of PNGs and PVNGs. As an example of the use of the SCEE and SCEAPI, the PVNG 28 may be used to develop applications for the public network by utilizing SCEAPI and SCEE in order to provide access to the network elements under the control of the PNG 27. For example, a service for a public telecommunications network may be formulated on a PVNG 28 and relayed via a SCEAPI compliant communication channel to the PNG 27 which will validate the service logic and invoke the requisite capabilities in the underlying public network(s) upon receiving a service invocation request from the PVNG 28. Alternatively, applications may be developed independently on the PVNG 28 and PNG 27 and invoked via SCEAPI and SCEE compliant directives from a co-resident application or by an application resident on an alternative PVNG or PNG (not shown).

Referring to FIG. 3, as an example of the use of the SCEE and SCEAPI to provide telecommunication services via the serial or concurrent execution of applications resident on a plurality of PNGs or PVNGs, upon meeting an initial set of conditional requirements associated with a subscribers profile such as the time of day, an application resident on a PNG 27 may invoke one or more applications resident on an PVNG 28. The PVNG 28 will validate the request and invoke the requisite capabilities in the underlying private networks or other applications or resources resident on the PVNG 28 in a serial or concurrent fashion pursuant to the SCEAPI compliant commands and parameters provided by the invoking application and pursuant to any incremental conditional requirements defined by service logic in the invoked applications. This method of providing telecommunication services can be extended in that the PVNG may elect, pursuant to the execution of service logic and other conditional requirements, invoke applications resident in a plurality of other alternative PNGs or PVNGs (not shown) in a concurrent or serial fashion.

Any sequence and number of PNGs or PVNGs may be invoked in order to provide a given telecommunication service. For example, a PVNG may invoke two PNGs and one of the PNGs may invoke an alternative PVNG in order to provide a given telecommunication service.

Figure 4:
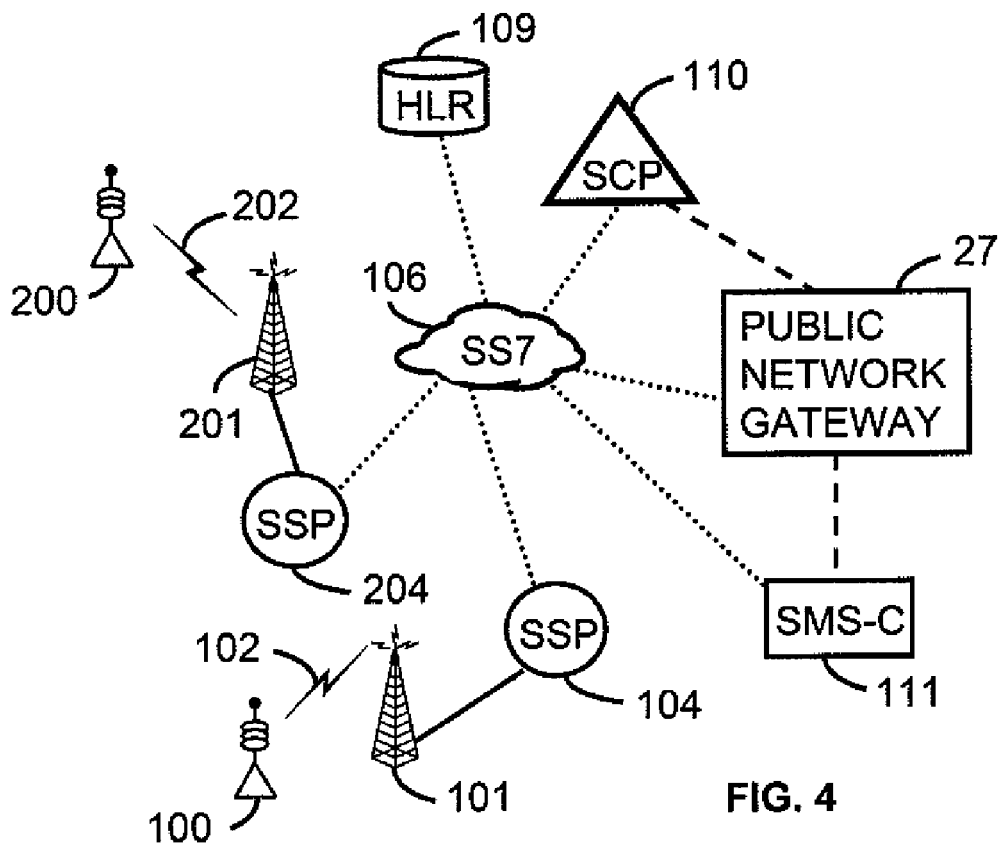
FIG. 4 is a block diagram illustrating an embodiment of a telecommunications system for a pre-paid short message service application of the present invention.

Referring to FIG. 4, the configuration of the PNG 27 in an example telecommunications system is illustrated in a block diagram for a pre-paid short message service application of the present invention. The example telecommunications system is derived from the telecommunications system illustrated in FIG. 3. An additional SSP 204, mobile station 200, and base-station 201 have been depicted in the example telecommunications network in order to provide a better understating of the present invention with reference to message flow diagrams illustrated in FIG. 5A and FIG. 5B.

Figure 5A:
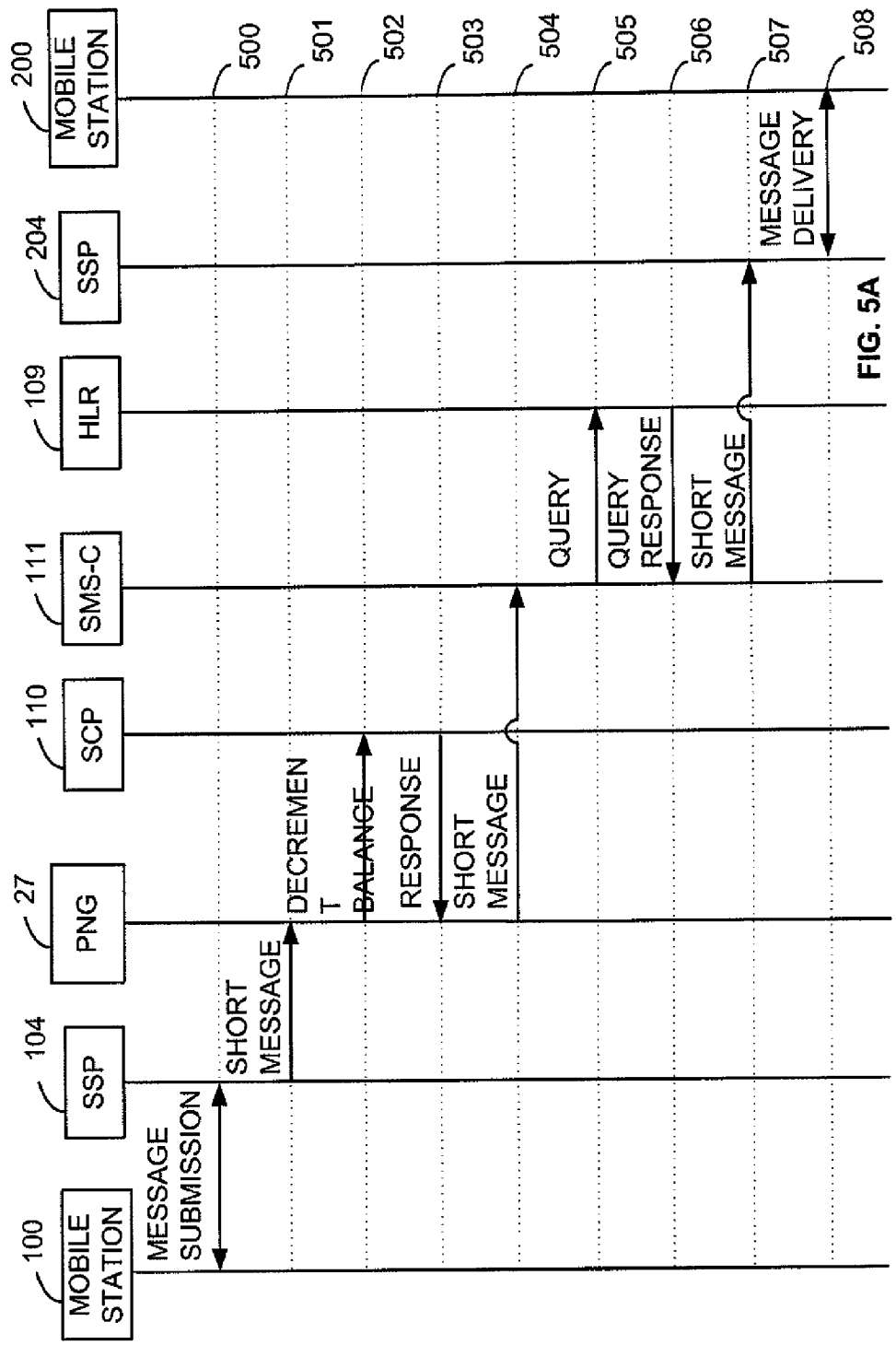

FIG. 5A and FIG. 5B depict message flow diagrams of a representative interaction which illustrate the inventive concepts for a pre-paid short message service application of the present invention for the example telecommunications network illustrated in FIG. 4. Those skilled in the art will recognize that the short message may be submitted and routed via the network elements depicted in the telecommunications network via a variety of methods including the procedures described in TIA TR 45.2 IS-841 and GSM 03.40. Detailed descriptions of well known short message delivery methods and procedures are omitted so as not to obscure the description of the present invention with unnecessary detail.

At 500, a mobile station 100 submits a short message for the destination mobile station 200 to its serving SSP 104 via radio link 102 and base station 101. The SSP 104 receives the short message and forwards the short message to the PNG 27 based on one or more translations. The translations required to direct the short message to the PNG 27 may be accommodated within the SSP 104 or within the SS7 network 106.

At 501, the PNG 27 receives the short message and invokes a prepaid short message application resident (not shown) on the PNG 27. The pre-paid short message application on PNG 27 determines the rate to be applied. Not shown are the message flows for an optional manifestation of the pre-paid short message service where the PNG 27 would accesses the HLR 109 in order to determine the rate based on the terminating mobile station's 200 current location. The pre-paid short message application on PNG 27 checks to see if the originating mobile station 100 has an account balance sufficiently above a minimum threshold. In this example, this validation is achieved by sending a decrement balance query to a database resident on the SCP 110. In an alternative manifestation of the service, the database could be resident in the PNG 27.

At 502, the SCP 110 decrements the originating mobile station's balance and sends back a response which indicates the result of the SCP's 110 action. The response would contain sufficient information to indicate whether the originating mobile station 100 has a sufficient balance for the short message to proceed to the terminating mobile station 200.

At 503, the PNG 27 receives the response from the SCP 110 and determines whether the message should proceed to the terminating mobile station based on the content of the response. For the purpose of this message flow sequence, it will be assumed that the originating mobile station 100 has a sufficient balance. The PNG 27 forwards the short message to the SMS-C 111.

At 504, the SMS-C 111 receives the short message and queries the HLR 109 in order to determine the current serving SSP 104 for the terminating mobile station.

At 505, the HLR 109 retrieves the current serving SSP 204 via an internal translation or database lookup and sends a response message which includes the identifier associated with the serving SSP 204.

At 506, the SMS-C 111 receives the response and forwards the short message to the serving SSP 204 indicated in the response message received from the HLR 109.

At 507, the serving SSP 204 receives the short message.

At 508, the serving SSP 204 delivers the short message to the terminating mobile station 200 via a base station and a radio link. The serving SSP 204 formulates and submits a short message result message to the SMS-C 111.

At 509, the SMS-C 111 receives the short message result message and formulates and submits delivery report to the PNG 27.

At 510, the PNG 27 receives the delivery report and forwards the content of the delivery report to the pre-paid short message application resident (not shown) on the PNG 27. The pre-paid short message application formulates and submits a short message to the MSC 104. The content and format of the short message may vary pursuant to the telecommunication network providers requirements. The received delivery report may also be used to provide a conciliation function in that the balance associated with the calling mobile station 100 may be adjusted depending on the outcome of the short message submission function carried out by the serving SSP 204 at 508.

At 511, the SSP 104 receives the short message.

At 512, the SSP 104 delivers the short message to the originating mobile station 100 via a base station and a radio link.

Referring to FIG. 4, FIG. 5A, and FIG. 5B, those skilled in the art will appreciate that the service creation environment provided by the PNG 27 in conjunction with SCEAPI and SCEE has provided for an innovative prepaid short message service offering which may not have otherwise been supported using the underlying network infrastructure.

Figure 6:
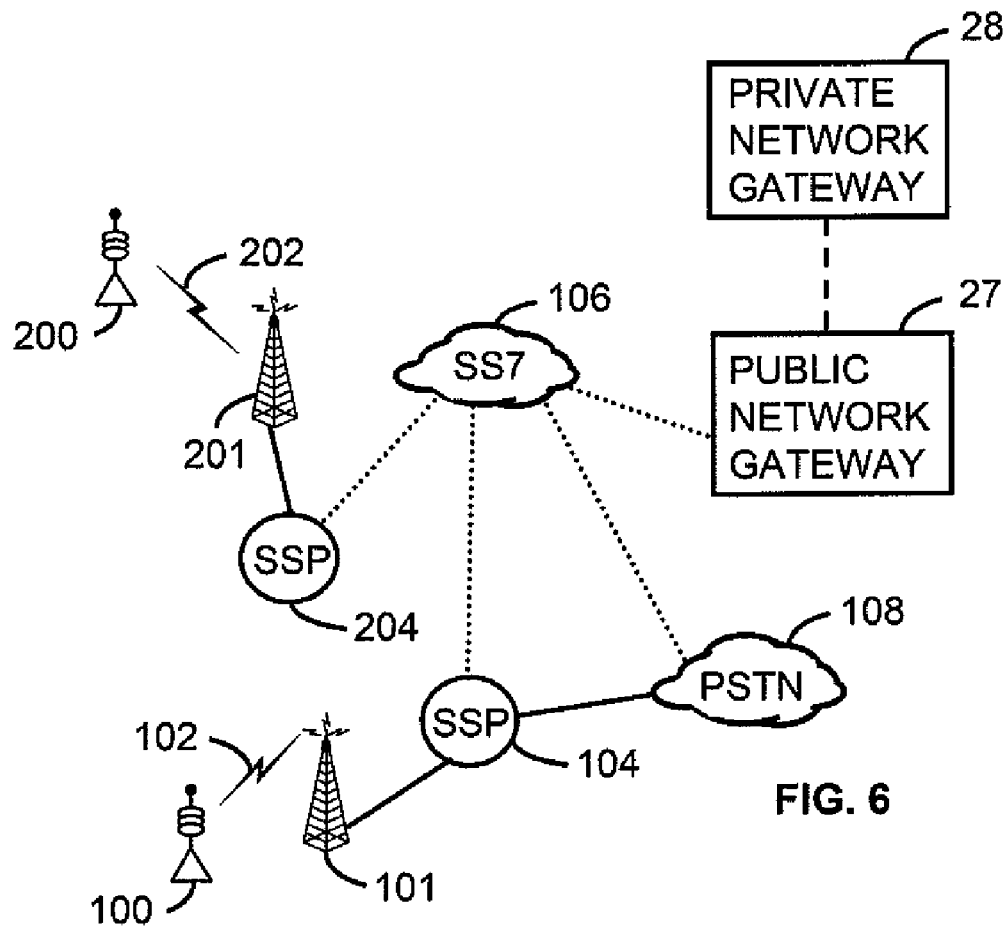
FIG. 6 is a block diagram illustrating an embodiment of a telecommunications system for a virtual private network application of the present invention.

Referring to FIG. 6, the configuration of the PNG 27 and PVNG 28 in an example telecommunications system is illustrated in a block diagram for a virtual private network service application of the present invention. The example telecommunications system is derived from the telecommunications systems illustrated in FIG. 3 and FIG. 4 and will be used to illustrated a virtual private network service application of the present invention with reference to the message flow diagrams illustrated in FIG. 7A and FIG. 7B.

Figure 7A:
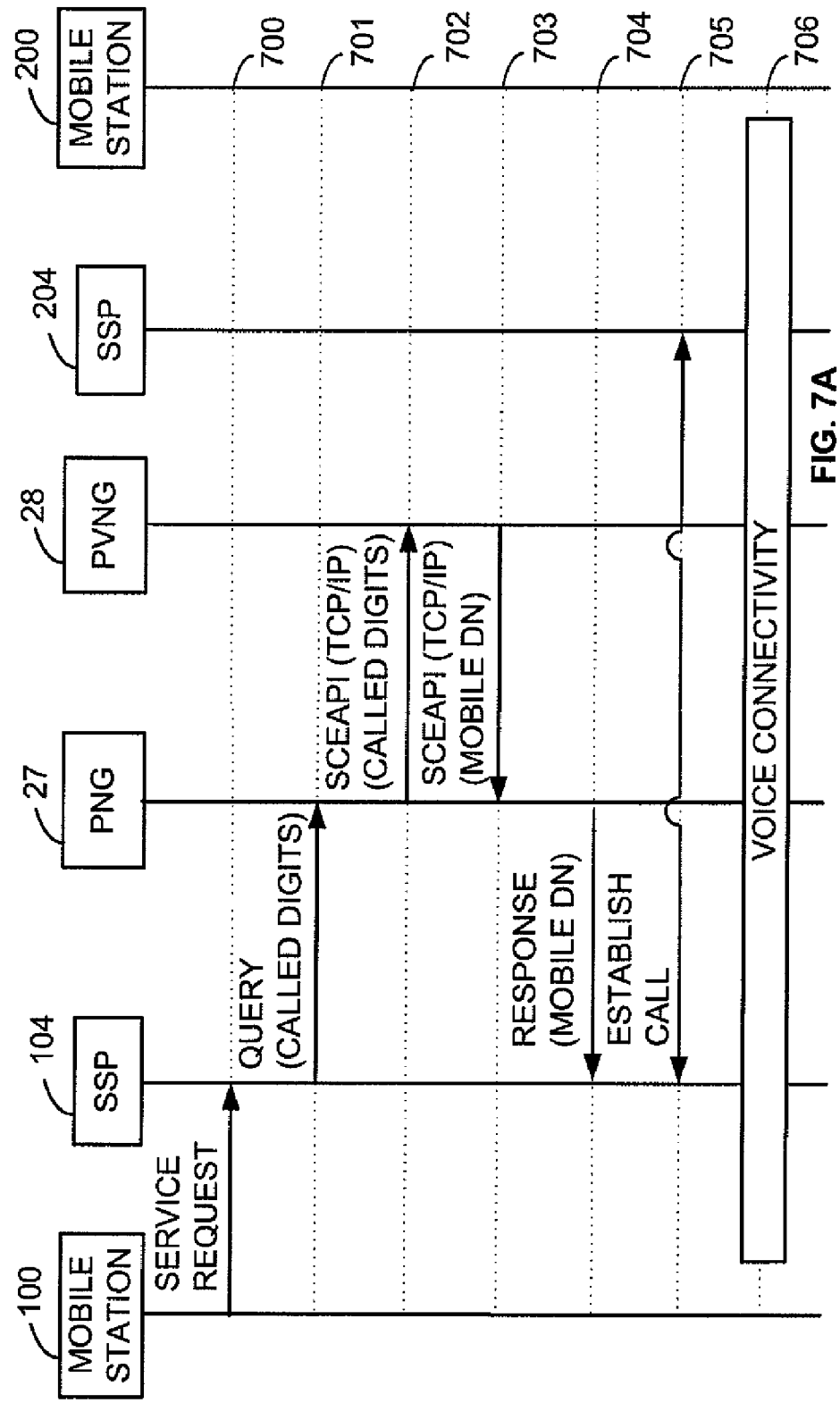
FIG. 7A and FIG. 7B show message flow diagrams of a representative interaction illustrating the inventive concepts for a virtual private network application of the present invention.
Figure 7B:
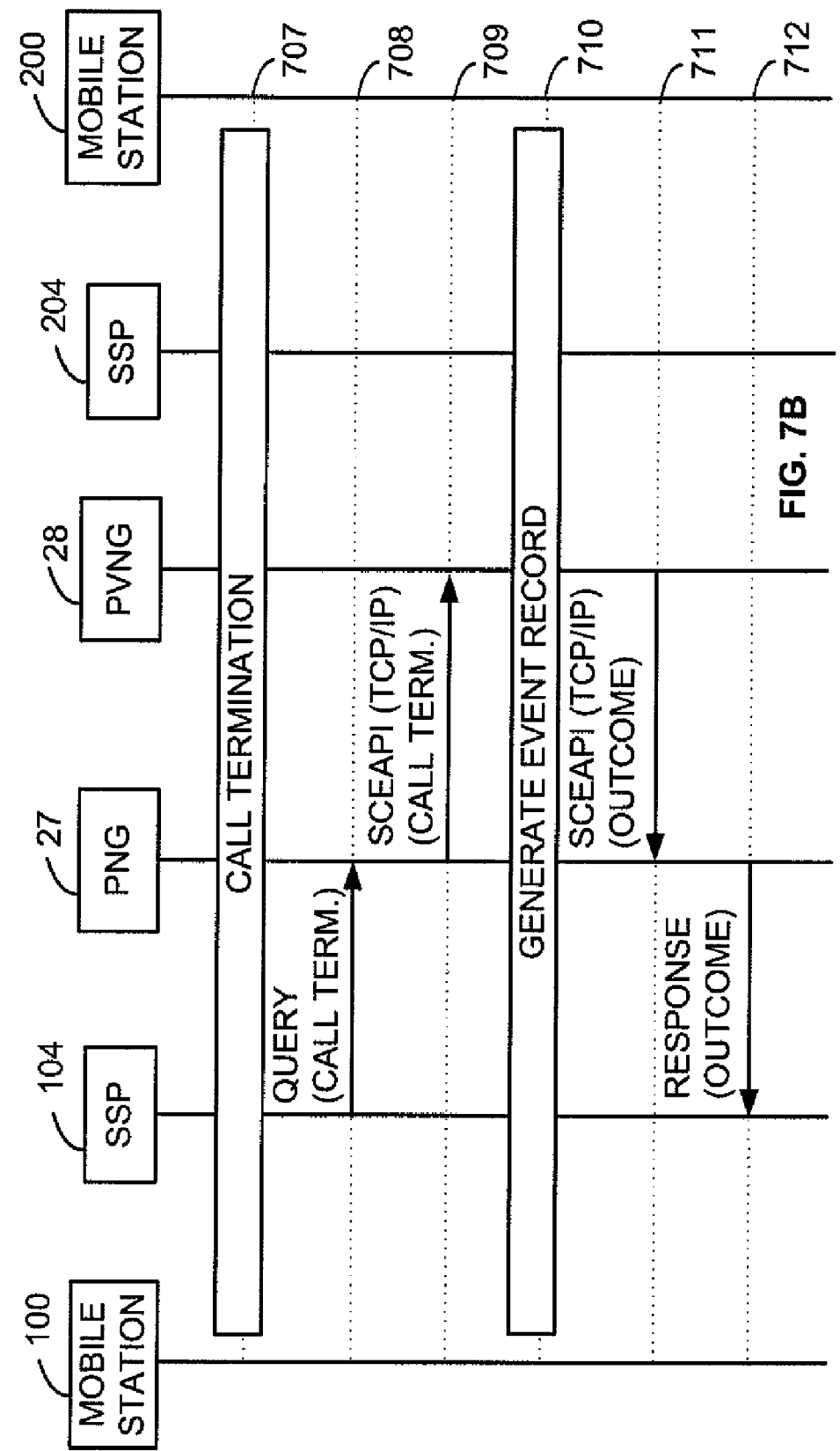

FIG. 7A and FIG. 7B depict message flow diagrams of a representative interaction which illustrates the inventive concepts for a virtual private network service application of the present invention for the example telecommunications network illustrated in FIG. 6. Those skilled in the art will recognize that queries and responses may be formulated and routed via a variety of methods including the procedures described by GSM 02.78, GSM 03.78, GSM 09.02, and GSM 09.78. Those skilled in the art will also recognize that circuit-switched calls may be established via a number of methods including via the procedures described in T1.113 and ITU-T Q series recommendations. Detailed descriptions of well known query and call establishment procedures are omitted so as not to obscure the description of the present invention with unnecessary detail.

At 700, a mobile station 100 submits a service request for the destination mobile station 200 to its serving SSP 104 via a radio link 102 and base station 101. The service request contains the private virtual network address for the destination mobile station 200. The private virtual network address will generally not be consistent with the addressing scheme used by the public telecommunications network. For example, the private virtual network address may contain fewer digits than the addressing scheme used by the public telecommunications network. The SSP 104 receives the service request and formulates a query which is forwarded to the PNG 27. The translations required to direct the query to the PNG 27 may be accommodated within the SSP 104 or within the SS7 network. The SSP 104 may use an IN or AIN trigger in order to detect the use of the private virtual network addressing scheme.

At 701, the PNG 27 receives the query and invokes a subscriber profile application resident (not shown) on the PNG 27 in order to ascertain state and profile information 37 pertaining to subscribers. Based on an internal translation or database 18 lookup, the subscriber profile application determines that the service logic for this particular application resides on the PVNG 28. For a group of subscribers, such a database 18 lookup would be associated with a single record. The PNG 27 forwards the query to the PVNG 28 via SCEAPI 19.

At 702, the PVNG 28 receives the query and invokes a private virtual network application (not shown) resident on the PVNG 28. The private virtual network application maps the private virtual network address to the destination address associated with the terminating mobile station 200 which is supported by the public telecommunications network. The PVNG 28 formulates and sends a response which contains the public destination address associated with the terminating mobile station 200 to the PNG 27 via SCEAPI 19.

At 703, the PNG 27 receives the response from the PVNG 28 and invokes a subscriber profile application resident (not shown) on the PNG 27 in order to ascertain state and profile information 37 pertaining to subscribers. For a group of subscribers, such a database 18 lookup would be associated with a single record. Based on an internal translation or database lookup, the subscriber profile application determines that the response was associated with a previous query and formulates a response which will forward the instructions received from the PVNG 27 to the SSP 104. The content and format of the response may vary pursuant to the telecommunication network providers requirements including the capabilities supported by the SSP 104. For example, the response message would vary as a function of whether the SSP 104 supports IN or AIN compliant triggers.

At 704, the SSP 104 receives the response from the PNG 27.

At 705, the SSP 104 invokes the procedures to establish a call to the terminating SSP 200. Not shown are the message flows which are used to establish connectivity via the circuit-switched or packet based network. Not shown are the message flows which may be required in order to determine the serving SSP 200 via an HLR 109 in a mobile environment.

At 706, a voice connection between the originating mobile station 100 and the destination mobile station 200 is established and voice communication takes place. During this call, the virtual private networking application resident on the PVNG 27 maintains call timers for the call in order to generate an event record upon call termination.

At 707, the call is terminated by either the calling or terminating mobile stations.

At 708, upon recognizing that the call has terminated, the originating SSP 104 formulates a query indicating that the call has been terminated and forwards the query to the PNG 27. The query is received by the PNG 27 and the subscriber profile application resident (not shown) on the PNG 27 is invoked. Based on an internal translation or database lookup, the subscriber profile application formulates a response which will forward the query received from the PNG 27 to the PVNG 28 via SCEAPI.

At 709, the query is received by the PVNG 28 and the private virtual network application resident (not shown) on the PVNG 28 is invoked. Based on an internal translation or database lookup, the prepaid application determines that the query was associated with an existing session.

At 710, the private virtual network application generates an event record which contains the details of the call (for example, originating identifiers, terminating identifiers, call duration) which may be used by either the private or public telecommunications network operator in order to apply a specific rate for the call. In an alternative manifestation of the service, the PNG 27 may generate the event record. In an alternative manifestation of the service, the PNG 27 or the PVNG 28 could determine and record the rate for the call via a rating engine resident on either the PNG 27 or PVNG 28. The PVNG 28 formulates a response indicating the outcome of the query request and submits the response to the PNG 27 via SCEAPI 19.

At 711, the response is received by the PNG 27 and the subscriber profile application resident (not shown) on the PNG 27 is invoked. Based on an internal translation or database lookup, the subscriber profile application recognizes that the response is associated with an existing session and forwards the query received to the originating SSP 104.

At 712, the response is received by the originating SSP 104. The originating SSP 104 recognizes that the response is associated with an earlier query and closes the session associated with the query.

Referring to FIG. 6, FIG. 7A, and FIG. 7B, those skilled in the art will appreciate that the service creation environment provided by the PNG 27 and PVNG 28 in conjunction with SCEAPI 19 and SCEE 15 have provided for an innovative virtual private network offering which may not have otherwise been supported using the underlying network infrastructure.

Those skilled in the art will appreciate that the service creation environment provided by the PNG 27 and PVNG 28 in conjunction with SCEAPI 19 and SCEE 15 can be utilized for the purpose of applying capabilities and services for a group of subscribers. As an example of a service for a group of subscribers, a call-attendant function whereby calls are diverted to a live call attendant once a set of prescribed conditions have been met (e.g. terminating number busy) can be applied across a group of subscribers whose state and profile information 37 is associated with a single record as stored within database 18.

Figure 8:
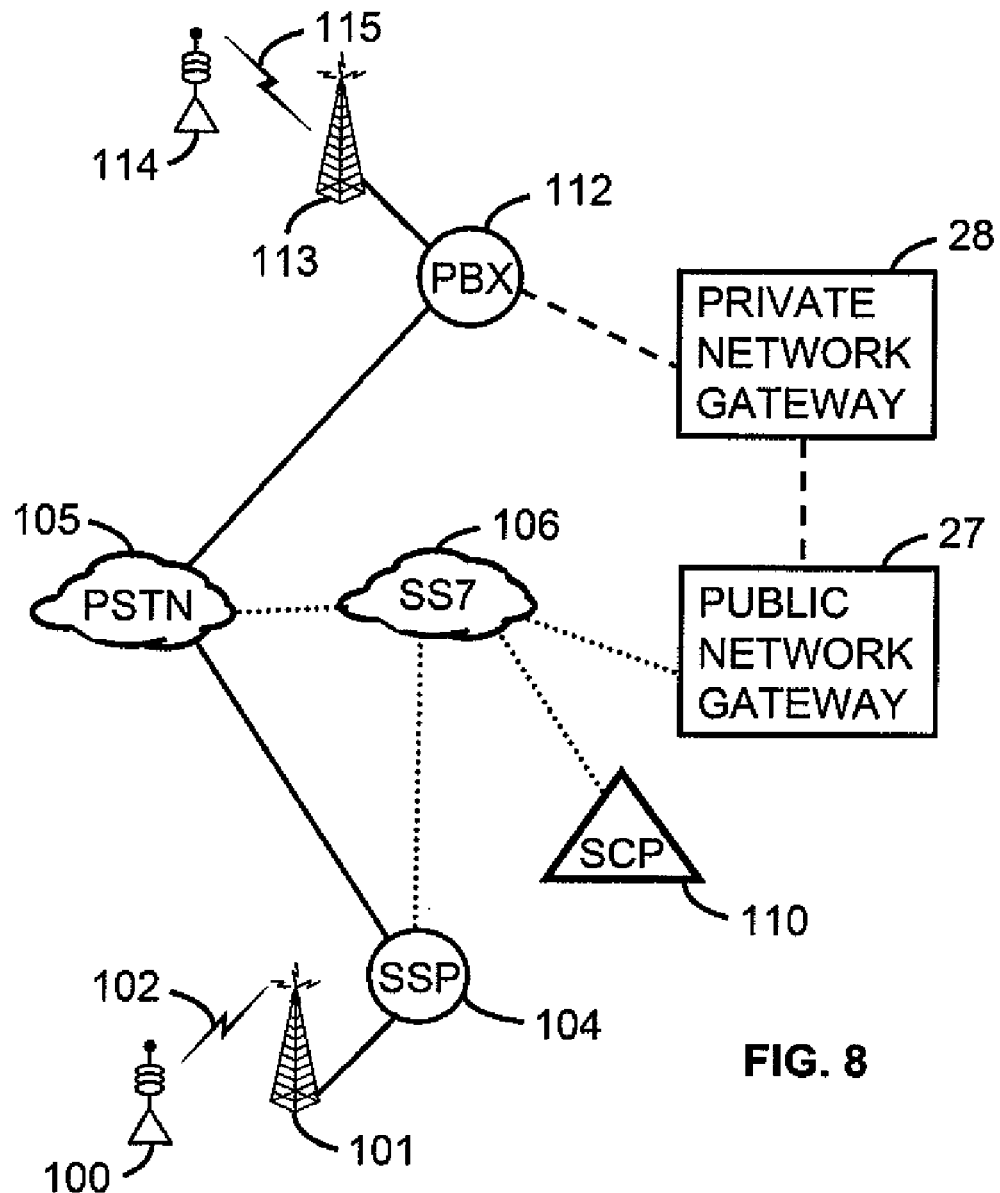
FIG. 8 is a block diagram illustrating an embodiment of a telecommunications system for a pre-paid private network billing application of the present invention.

Referring to FIG. 8, the configuration of the PNG 27 and PVNG 28 in an example telecommunications system is illustrated in a block diagram for a private network pre-paid service application of the present invention. The example telecommunications system is derived from the telecommunications systems illustrated in FIG. 3 and FIG. 4 and will be used to illustrate a private network service pre-paid application of the present invention with reference to the message flow diagrams illustrated in FIG. 9A and FIG. 9B.

Figure 9A:
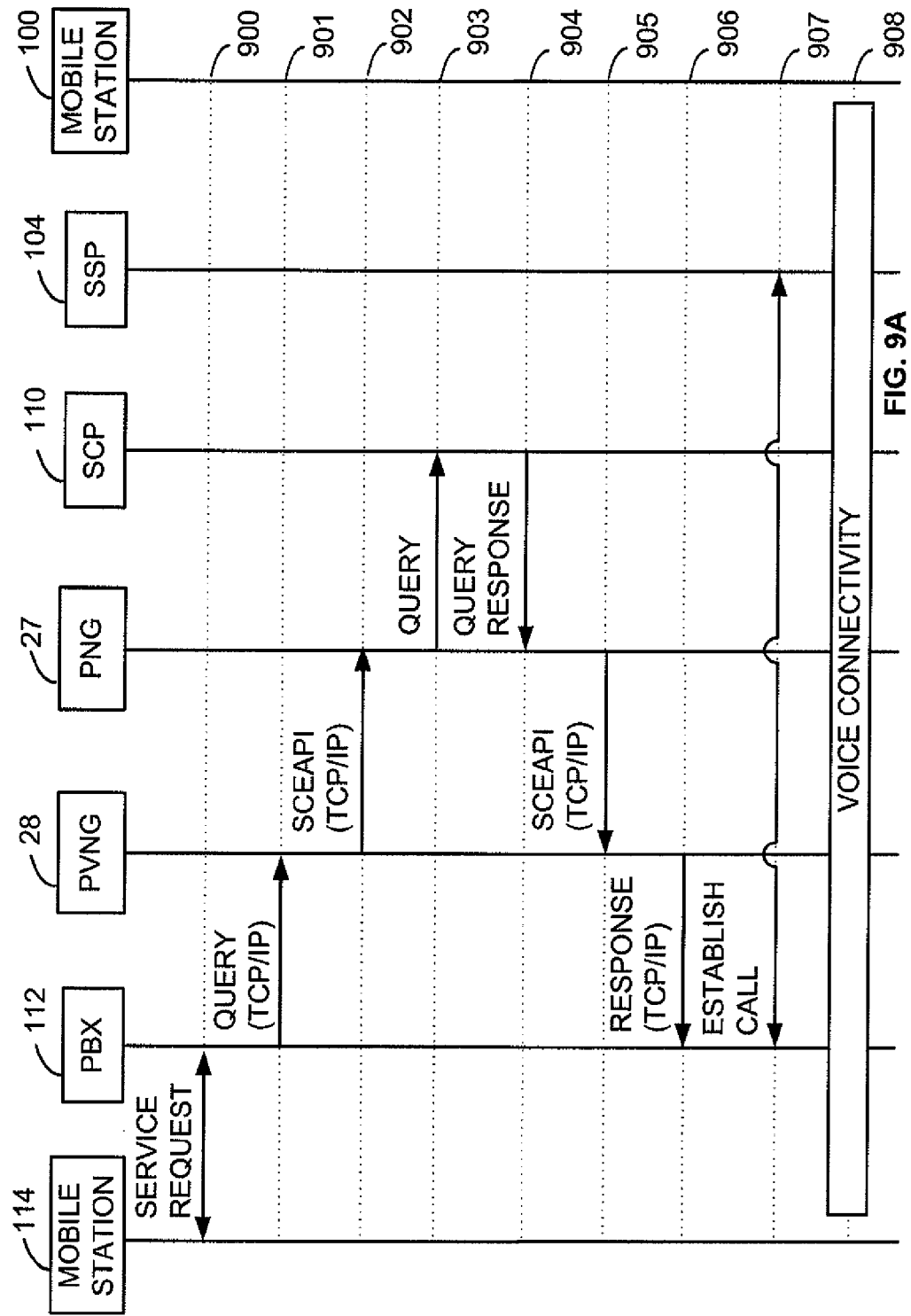
FIG. 9A and FIG. 9B show message flow diagrams of a representative interaction illustrating the inventive concepts for a pre-paid private network billing application of the present invention.
Figure 9B:
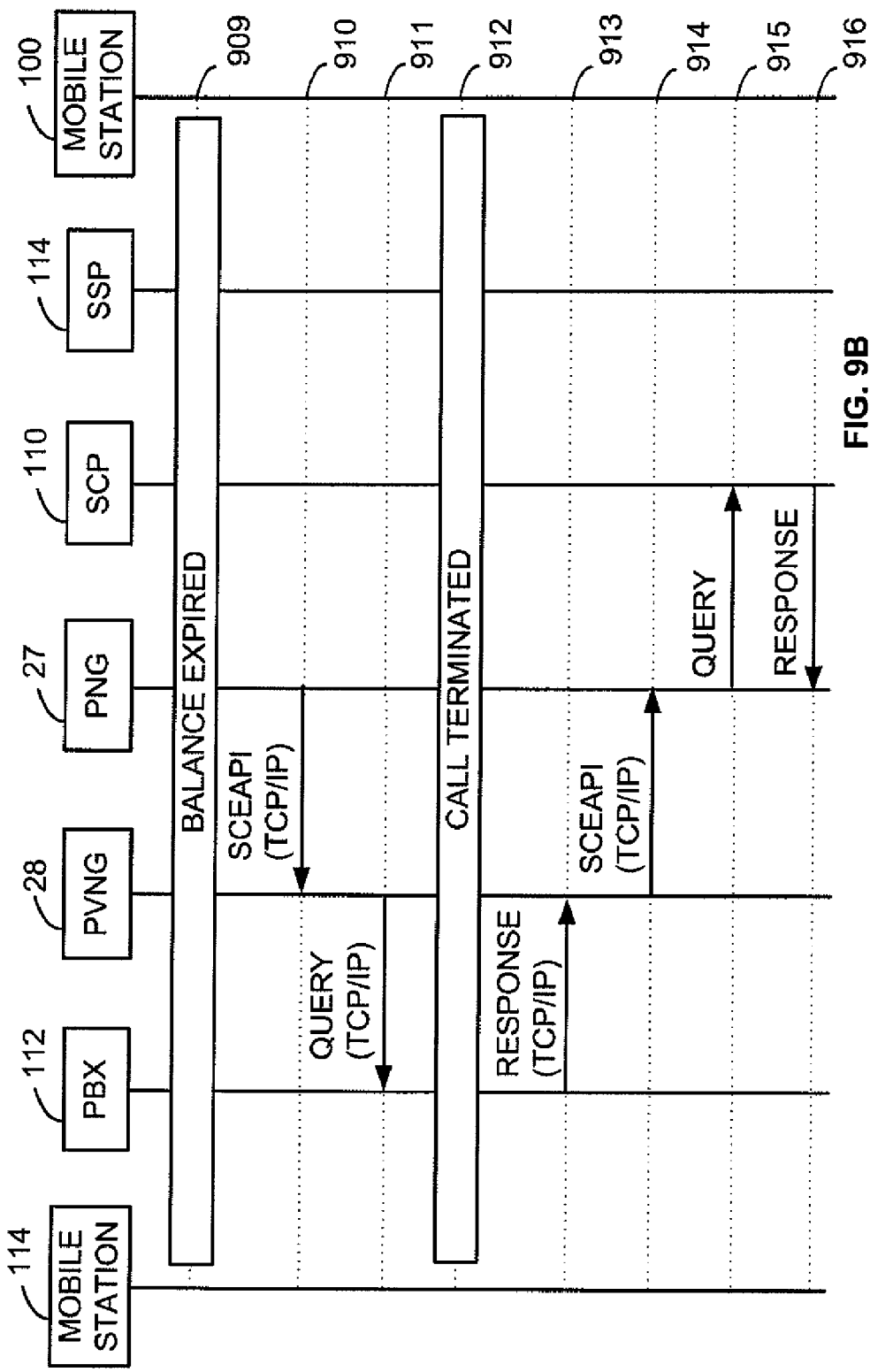

FIG. 9A and FIG. 9B depict a message flow diagrams of a representative interaction which illustrates the inventive concepts for a private network pre-paid service application of the present invention for the example telecommunications network illustrated in FIG. 8. Those skilled in the art will recognize that queries and responses may be formulated and routed via a variety of methods including via the procedures described by GSM 02.78, GSM 03.78, GSM 09.02, and GSM 09.78. Those skilled in the art will also recognize that circuit-switched calls may be established via a number of methods including via the procedures described in T1.113 and ITU-T Q series recommendations. Detailed descriptions of well known query and call establishment procedures are omitted so as not to obscure the description of the present invention with unnecessary detail.

At 900, mobile station 114 submits a service request for the destination mobile station 200 to its serving PBX 112 via a radio link 115 and base station 113. The service request contains the network address of the originating mobile station 114. The PBX 112 receives the service request and recognizes, based on an internal translation, mapping, or database lookup, that additional call treatments may need to be applied for calls originated from the mobile station 114 and formulates a query which is forwarded to the PVNG 28.

At 901, the PVNG 28 receives the query and invokes a subscriber profile application resident (not shown) on the PVNG 28. Based on an internal translation or database lookup, the subscriber profile application determines that the originating mobile station 114 is associated with a pre-paid application which is resident on the PNG 27. The PVNG 28 forwards the query to the PNG 27 via SCEAPI 19.

At 902, the PNG 27 receives the query and invokes a pre-paid application resident (not shown) on the PNG 27. The pre-paid short message application on PNG 27 determines the rate to be applied. Not shown are the message flows for an optional manifestation of the pre-paid service where the PNG 27 would accesses the HLR 109 in order to determine the rate based on the terminating mobile station's 200 current location. The pre-paid application on the PNG 27 checks to see if the originating mobile station 100 has an account balance sufficiently above a minimum threshold. In this example, this check is achieved by sending a decrement balance query to a prepaid subscriber account database resident (not shown) on the SCP 110. In an alternative manifestation of the service, the prepaid subscriber account database could be resident in the PNG 27.

At 903, the SCP 110 checks the originating mobile station's 114 balance and sends back a response which indicates the result of the SCP's 110 action. For the purpose of this example, the response will contain the originating mobile station's balance.

At 904, the PNG 27 receives the response from the SCP 110 and determines whether the message should proceed to the terminating mobile station 100 based on the content of the response. For the purpose of this message flow sequence, it will be assumed that the originating mobile station 114 has a sufficient balance. The PNG 27 formulates a response indicating that the call may proceed and submits the response to the PVNG 28 via SCEAPI.

At 905, the PVNG 28 receives the response from the PNG 27 and invokes a subscriber profile application resident (not shown) on the PVNG. Based on an internal translation or database lookup, the subscriber profile application determines that the response was associated with a previous query and formulates a response which will forward the instructions received from the PNG 27 to the PBX 112. The content and format of the response may vary pursuant to the private network providers requirements including the capabilities supported by the PBX 112.

At 906, the PBX 106 receives the response from the PVNG 28.

At 907, the PBX invokes the procedures to establish a call to the terminating SSP 104. Not shown are the message flows which are used to establish connectivity via the circuit-switched or packet based network. Not shown are the message flows which may be required in order to determine the serving SSP 104 via an HLR 109 in a mobile environment.

At 908, a voice connection between the originating mobile station 114 and the destination mobile station 100 is established and voice communication takes place. During this call, the prepaid application resident on the PNG 27 maintains call timers to decrement the calling subscribers account in accordance with the billing rate of the call.

At 909, the prepaid application resident on the PNG 27 determines that the client's balance has expired. The prepaid application resident on the PNG 27 formulates a query indicating that the call should be terminated. The query is forwarded to the PVNG via SCEAPI.

At 910, the query is received by the PVNG 28 and the subscriber profile application resident (not shown) on the PVNG 28 is invoked and executed using SCEE.

Based on an internal translation or database lookup, the subscriber profile application formulates a query which will forward the instructions received from the PNG 27 to the PBX 112. The content and format of the query may vary pursuant to the private network providers requirements including the capabilities supported by the PBX 112.

At 911, the PBX 112 receives the query from the PVNG 28.

At 912, the PBX 112 invokes the procedures to terminate the existing call to the terminating SSP 100. Not shown are the message flows which are used to terminate connectivity via the circuit-switched or packet based network. The PBX formulates a query response which indicates that the call has been terminated and forwards the query response to the PVNG 28.

At 913, the PVNG receives the query response and invokes a subscriber profile application resident (not shown) on the PVNG 28. Based on an internal translation or database lookup, the subscriber profile application determines that the response was associated with a previous query and formulates a response which will forward the contents of the query response to the PNG 27 via SCEAPI 19.

At 914, the PNG receives the query response and invokes a pre-paid application resident (not shown) on the PNG 27. Based on an internal translation or database lookup, the pre-paid application determines that the response was associated with a previous query. The prepaid application formulates a query to the SCP 110 which will be used to decrement the balance by a suitable amount.

At 915, the SCP 110 receives the query and decrements the originating mobile station's 114 balance and sends back a response which indicates the result of the SCP's 110 action.

At 916, the PNG 27 receives the response and invokes a prepaid application resident on the PNG 27. Based on an internal translation or database lookup, the prepaid application determines that the response was associated with a previous query and closes the session associated with the originating mobile station 114.

Referring to FIG. 8, FIG. 9A, and FIG. 9B, those skilled in the art will appreciate that the service creation environment provided by the PNG 27 and PVNG 28 in conjunction with SCEAPI 19 and SCEE 15 have provided for an innovative pre-paid service for mobile stations served by the private domain which may not have otherwise been supported using the underlying network infrastructure.

Figure 10:
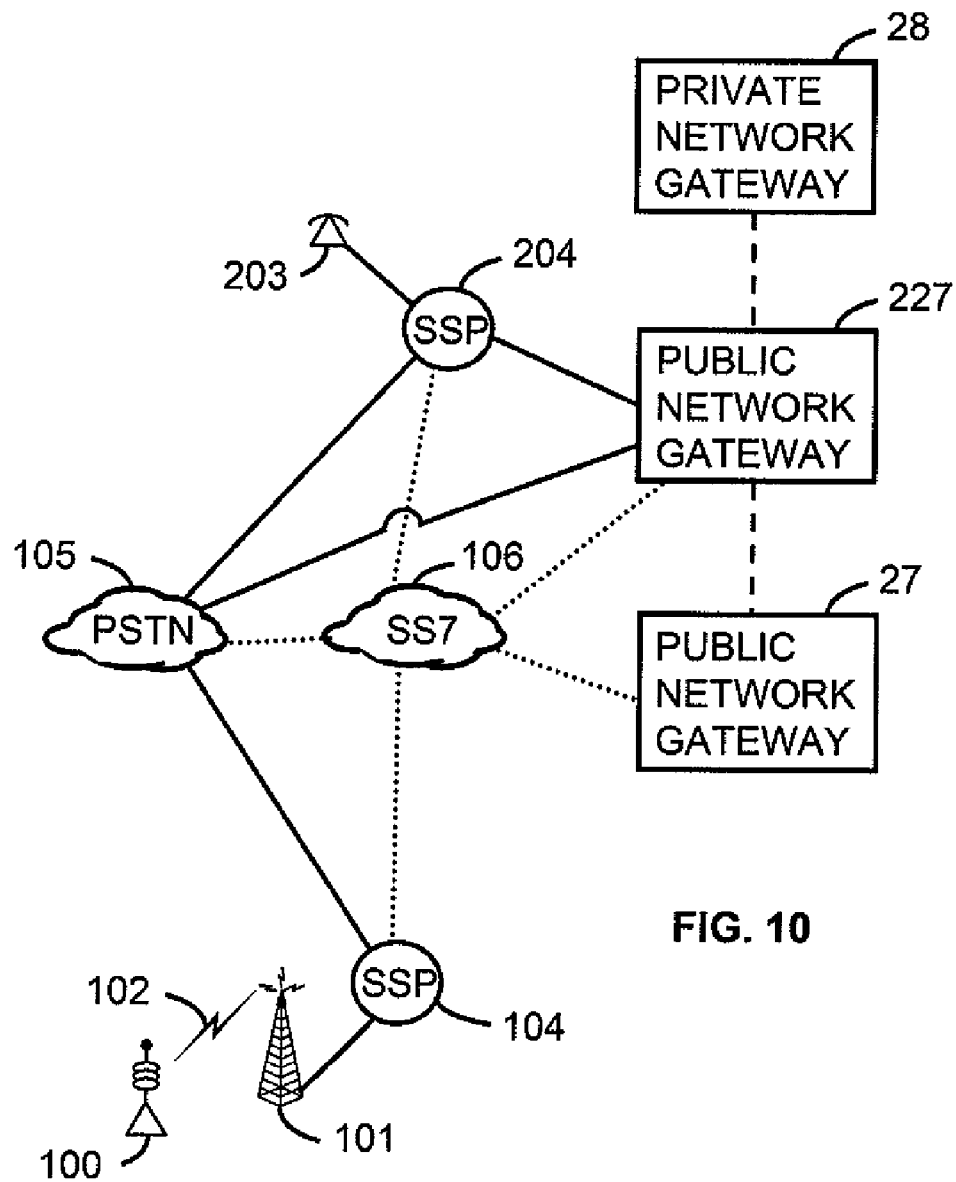
FIG. 10 is a block diagram illustrating an embodiment of a telecommunications system for a transcription application of the present invention.

Referring to FIG. 10, the configuration of the PNG 27, PVNG 28, and an additional PNG 227 in an example telecommunications system is illustrated in a block diagram for a transcription service application of the present invention. The example telecommunications system is derived from the telecommunications systems illustrated in FIG. 3 and FIG. 4 and will be used to illustrate a virtual private network service application of the present invention with reference to the message flow diagrams illustrated in FIG. 11A and FIG. 11B.

Figure 11A:
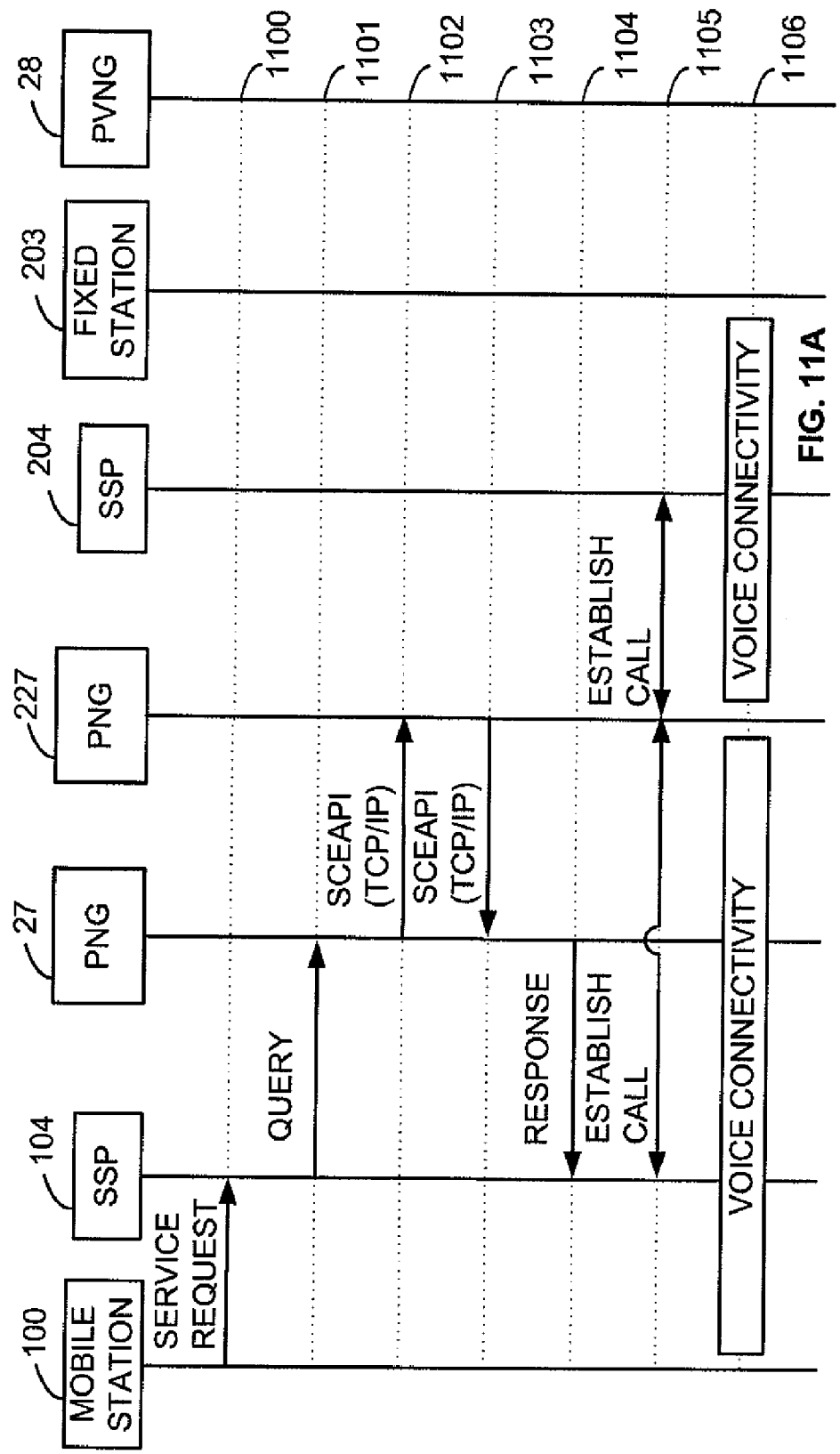
FIG. 11A and FIG. 11B show message flow diagrams of a representative interaction illustrating the inventive concepts for a transcription application of the present invention.
Figure 11B:
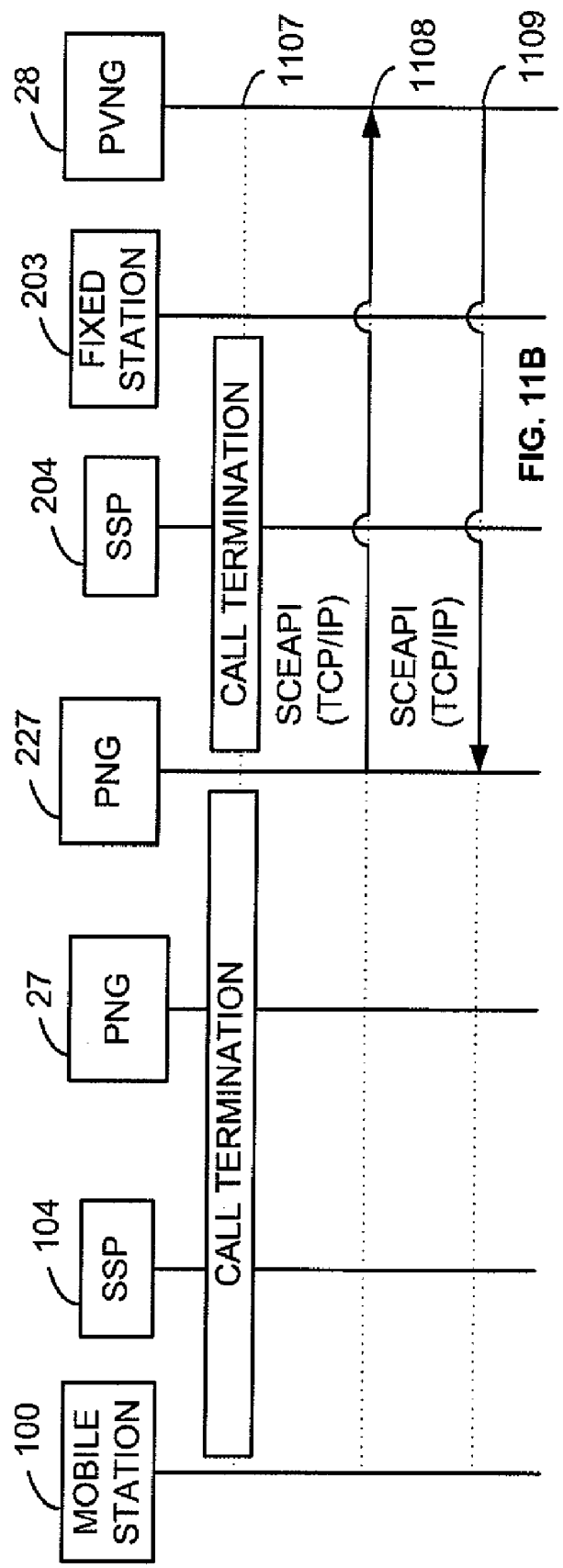

FIG. 11A and FIG. 11B depict a message flow diagrams of a representative interaction which illustrates the inventive concepts for a transcription service application of the present invention for the example telecommunications network illustrated in FIG. 10. Those skilled in the art will recognize that queries and responses may be formulated and routed via a variety of methods including via the procedures described by GSM 02.78, GSM 03.78, GSM 09.02, and GSM 09.78. Those skilled in the art will also recognize that circuit-switched calls may be established via a number of methods including via the procedures described in T1.113 and ITU-T Q series recommendations. Detailed descriptions of well known query and call establishment procedures are omitted so as not to obscure the description of the present invention with unnecessary detail.

At 1100, a mobile station 100 submits a service request for the destination fixed station 203 to its serving SSP 104 via a radio link 102 and base station 101. The SSP 104 receives the service request and recognizes, based on an internal translation, mapping, or database lookup, that additional call treatments may need to be applied for calls originated from the mobile station 100 or for calls destined to the fixed station 203 and formulates a query which is forwarded to the PNG 27.

At 1101, the PNG 27 receives the query and invokes a subscriber profile application resident (not shown) on the PNG 27. Based on an internal translation or database lookup, the subscriber profile application determines that the originating mobile station 100 is associated with an application which is resident on an second PNG 227. The PNG 28 forwards the query to the second PNG 227 via SCEAPI 19.

At 1102, the second PNG 227 receives the query and invokes a subscriber profile application resident (not shown) on the second PNG 227. Based on an internal translation or database lookup, the subscriber profile application determines that the originating mobile station 100 or the terminating fixed station is associated with a transcription service. Pursuant to the service logic associated with the transcription service, the second PNG 227 sends a response back to the PNG which contains a SCEAPI directive to route the call to the second PNG.

At 1103, the PNG 27 receives the response from the second PNG 227 and invokes a subscriber profile application resident (not shown) on the PNG 27. Based on an internal translation or database lookup, the subscriber profile application determines that the response was associated with a previous query and formulates a response which will forward the instructions received from the second PNG 227 to the SSP 104. The content and format of the response may vary pursuant to the telecommunication network provider's requirements including the capabilities supported by the SSP 104. For example, the response message would vary as a function of whether the SSP 104 supports IN or AIN compliant triggers.

At 1104, the SSP 104 receives the response from the PNG 27.

At 1105, the SSP invokes the procedures to establish a call to the second PNG 227 based on the destination address received in the response from the PNG 27. Not shown are the message flows which are used to establish connectivity via the circuit-switched or packet based network. Upon receiving the call, the second PNG 227 invokes a subscriber profile application resident (not shown) on the PNG 227. Based on an internal translation or database lookup, the subscriber profile application determines that the response was associated with a previous query and establishes a call to the fixed station 203. Not shown are the message flows which are used to establish connectivity via the circuit-switched or packet based network. The message flows associated with establishing connectivity between the mobile station 100 and fixed station 203 may be used by the second PNG 227 in order to invoke a speech to text transcription application (not shown).

At 1106, a voice connection between the originating mobile station 100 and the destination fixed station 203 is established via the second PNG 227 and voice communication takes place. During this call, the transcription application resident on the second PNG 227 transcribes the conversation via a speech to text application (not shown) which is invoked by the subscriber profile application upon receipt of an answer signal or message. The transcribed conversation is stored in file on a database which resides on the second PNG 227.

At 1107, the call is terminated by either the calling mobile station 100 or the terminating fixed station 203. Not shown are the message flows which are used to terminate connectivity via the circuit-switched or packet based network between the mobile station 100 and the fixed station 204 via the second PNG 227. The speech to text transcription application resident on the second PPG terminates the transcription process and informs the subscriber profile application resident (not shown) on the second PNG 227 that the transcription process has been completed and the location and name of the transcription file. Based on an internal translation or database lookup, the subscriber profile application formulates a message which will forward the transcription file to a PVNG 28 via SCEAPI.

At 1108, the PVNG 28 receives the SCEAPI directive and stores the file pursuant to the commands in the SCEAPI directive. The PVNG 28 formulates and transmits an acknowledgement message to the second PNG 227 via SCEAPI.

At 1109, the second PNG 227 receives the acknowledgement message and terminates the session associated with the transcription service application. Not shown are any incremental messages which may be required to terminate any active sessions in either the second PNG 227 or PNG 27.

Referring to FIG. 10, FIG. 11A, and FIG. 11B, those skilled in the art will appreciate that the service creation environment provided by the PNG 27, second PNG 227, and PVNG 28 in conjunction with SCEAPI 19 have provided for an innovative transcription service for both fixed and mobile stations in the public domain which may not have otherwise been supported using the underlying network infrastructure.

While the foregoing describes what are considered to be preferred example embodiments of the invention, it is understood that various modifications may be made therein and that the invention may be implemented in various forms and embodiments, and that it may be applied in numerous applications, only some of which have been described. The claims are intended to cover all such modifications and variations which fall within the true scope of the invention.

What is claimed is:

1. A method of distributing and executing service logic with a private or public telecommunications system, the method comprising:

interfacing with a plurality of public communications network elements, wherein the plurality of public communications network elements includes at least one switching center and a plurality of intelligent network elements having at least one of a service switching function and a service control function;

wherein a set of informational and control parameters and variables associated with at least one of the plurality of public communications network elements are distilled into a first vector of alphanumeric values or network element objects;

receiving at least one application request for communicating with or controlling at least one of the plurality of public communications network elements, the application request being formatted according to the first vector;

interfacing with a plurality of private communication's network elements, wherein the plurality of private communications network elements includes a private branch exchange in which access is provided between the public communications network elements and the private network communications elements over at least one interface; and communicating with or controlling at least one of the plurality of public communications network elements according to the at least one application request, utilizing the native communication protocols supported by the plurality of public communications network elements and the plurality of private network communications elements.

2. The method according to claim 1, wherein the set of informational and control parameters and variables associated with at least one of the plurality of private communications network elements are distilled into a second vector of alphanumeric values or network element objects.

3. The method according to claim 2, wherein the second vector of alphanumeric values or network element objects define state information of a subscriber associated with the at least one request.

4. The method according to claim 2, wherein the second vector of alphanumeric values or network element objects define state information of a circuit-switched or packet-switched session associated with the at least one request.

5. The method according to claim 2, wherein the second vector of alphanumeric values or network element objects define a plurality of controllable attributes of at least one of the plurality of private communications network elements.

6. The method according to claim 2 wherein the second vector of alphanumeric values or network element objects are utilized to provide an application programming, interface which executes on a computer platform located in the private network domain.

7. The method according to claim 1, wherein the first vector of alphanumeric values or network element objects define state information of a subscriber associated with the at least one request.

8. The method according to claim 1, wherein the first vector of alphanumeric values or network element objects define state information of a circuit-switched or packet-switched session associated with the at least one request.

9. The method according to claim 1, wherein the first vector of alphanumeric values or network element objects define a plurality of controllable attributes of at least one of the plurality of public communications network elements.

10. The method according to claim 1 wherein the first vector of alphanumeric values or network element objects are utilized to provide an application programming interface which executes on a computer platform.

11. A method of distributing and executing service logic with a private or public telecommunications system, the method comprising:

interfacing with a plurality of public communications network elements, wherein the plurality of public communications network elements includes at least one switching center, and a plurality of intelligent network elements having at least one of a service switching function and a service control function;

interfacing with a plurality of private communications network elements, wherein the plurality of private network elements includes a private branch exchange in which access is provided between the public communications network elements and the private network communications elements over at least one interface, wherein a set, of informational and control parameters and variables associated with at least one of the plurality of private communications network elements are distilled into a first vector of alphanumeric values or network element objects;

receiving at least one application request for communicating with or controlling at least one of the plurality of public communications network elements, the application request being formatted according to the first vector; and communicating with or controlling at least one of the plurality of public communications network elements according to the at least one application request, utilizing the native communication protocols supported by the plurality of public communications network elements and the plurality of private communications network elements.

12. The method according to claim 11, wherein the informational and control parameters and variables associated with at least one of the plurality of public communications network elements are distilled into a second vector of alphanumeric values or network element objects.

13. The method according to claim 12, wherein the second vector of alphanumeric values or network element objects define state information of a subscriber associated with the at least one request.

14. The method according to claim 12, wherein the second vector of alphanumeric values or network element objects define state information of a circuit-switched or packet-switched session associated with the at least one request.

15. The method according to claim 12, Wherein the second vector of alphanumeric values or network element objects define a plurality of controllable attributes of at least one of the plurality of public communications network elements.

16. The method according to claim 12 wherein the second vector of alphanumeric values or network element objects are utilized to provide an application programming interface which executes on a computer platform.

17. The method according to claim 11, wherein the first vector of alphanumeric values or network element objects define state information of a subscriber associated with the at least one request.

18. The method according to claim 11, wherein the first vector of alphanumeric values or network element objects define state information of a circuit-switched or packet-switched session associated with the at least one request.

19. The method according to claim 11, wherein the first vector of alphanumeric values or network element objects define a plurality of controllable attributes of at least one of the plurality of private communications network elements.

20. The method according to claim 11 wherein the first vector of alphanumeric values or network element objects are utilized to provide an application programming interface which executes on a computer platform located in the private network domain.

* * * * *